United States Patent
Ikeda et al.

(10) Patent No.: US 11,874,982 B2
(45) Date of Patent: Jan. 16, 2024

(54) DUAL DISPLAY DEVICE WITH TWO TOUCH SENSORS

(71) Applicant: Japan Display Inc., Tokyo (JP)

(72) Inventors: Masanobu Ikeda, Tokyo (JP); Naoki Takada, Toyko (JP); Kentaro Okuyama, Toyko (JP)

(73) Assignee: Japan Display Inc., Tokyo (JP)

( * ) Notice: Subject to any disclaimer, the term of this patent is extended or adjusted under 35 U.S.C. 154(b) by 52 days.

(21) Appl. No.: 17/580,930

(22) Filed: Jan. 21, 2022

(65) Prior Publication Data

US 2022/0147174 A1 May 12, 2022

Related U.S. Application Data

(63) Continuation of application No. PCT/JP2020/029138, filed on Jul. 29, 2020.

(30) Foreign Application Priority Data

Jul. 31, 2019 (JP) .................................. 2019-141736

(51) Int. Cl.
*G06F 3/041* (2006.01)
*G06F 3/044* (2006.01)
(Continued)

(52) U.S. Cl.
CPC .......... *G06F 3/0412* (2013.01); *G02F 1/1334* (2013.01); *G02F 1/13338* (2013.01);
(Continued)

(58) Field of Classification Search
CPC .. G06F 3/0412; G06F 3/04166; G06F 3/0445; G06F 3/0446; G02F 1/13338;
(Continued)

(56) References Cited

U.S. PATENT DOCUMENTS

2010/0277439 A1* 11/2010 Charlier ................ G06F 1/1626
345/176
2012/0019434 A1 1/2012 Kuhlman et al.
(Continued)

FOREIGN PATENT DOCUMENTS

| JP | 2014-505971 A | 3/2014 |
| JP | 2015-194641 A | 11/2015 |
| JP | 2018-021974 A | 2/2018 |

OTHER PUBLICATIONS

International Search Report issued in International Patent Application No. PCT/JP2020/029138 dated Oct. 20, 2020 and English translation of same. 5 pages.
(Continued)

*Primary Examiner* — Liliana Cerullo
(74) *Attorney, Agent, or Firm* — K&L Gates LLP

(57) ABSTRACT

According to an aspect, a sensor-equipped display device includes: an array substrate; a counter substrate; a first sensor configured to detect a first detection-target object close to the counter substrate; and a second sensor configured to detect a second detection-target object close to the array substrate. A first background of the array substrate is viewed from outside the counter substrate, and a second background of the counter substrate is viewed from outside the array substrate.

16 Claims, 31 Drawing Sheets

(51) Int. Cl.
  *G02F 1/1335* (2006.01)
  *G02F 1/1333* (2006.01)
  *G02F 1/1334* (2006.01)
  *G02F 1/1362* (2006.01)
  *G09G 3/36* (2006.01)

(52) U.S. Cl.
  CPC .. G02F 1/133616 (2021.01); G02F 1/136286 (2013.01); G06F 3/0445 (2019.05); G06F 3/0446 (2019.05); G06F 3/04166 (2019.05); G09G 3/3611 (2013.01); *G06F 2203/04108* (2013.01); *G09G 2300/023* (2013.01); *G09G 2300/0426* (2013.01); *G09G 2310/08* (2013.01); *G09G 2340/12* (2013.01)

(58) Field of Classification Search
  CPC ........ G02F 1/136286; G02F 1/133615; G09G 2340/12; G09G 2300/023
  See application file for complete search history.

(56) References Cited

U.S. PATENT DOCUMENTS

| | | |
|---|---|---|
| 2012/0163021 A1 | 6/2012 | Bohn et al. |
| 2016/0048252 A1* | 2/2016 | Oh ........................ G06F 3/0412 345/173 |
| 2018/0031758 A1 | 2/2018 | Mizuno et al. |
| 2019/0079324 A1* | 3/2019 | Numata ................ G02F 1/1334 |
| 2020/0150490 A1 | 5/2020 | Mizuno et al. |
| 2021/0116759 A1 | 4/2021 | Mizuno et al. |

OTHER PUBLICATIONS

Written Opinion issued in International Patent Application No. PCT/JP2020/029138 dated Oct. 20, 2020. 3 pages.

Japanese Office Action issued in related Japanese Patent Application No. 2019-141736, dated May 16, 2023 and English translation of same. 5 pages.

* cited by examiner

DUAL DISPLAY DEVICE WITH TWO TOUCH SENSORS

CROSS-REFERENCE TO RELATED APPLICATION

This application claims the benefit of priority from Japanese Patent Application No. 2019-141736 filed on Jul. 31, 2019 and International Patent Application No. PCT/JP2020/029138 filed on Jul. 29, 2020, the entire contents of which are incorporated herein by reference.

BACKGROUND

1. Technical Field

What is disclosed herein relates to a sensor-equipped display device.

2. Description of the Related Art

Japanese Patent Application Laid-open Publication No. 2018-021974 (JP-A-2018-021974) describes a display device including a first light-transmitting substrate, a second light-transmitting substrate disposed so as to be opposed to the first light-transmitting substrate, a liquid crystal layer including polymer-dispersed liquid crystals filled between the first light-transmitting substrate and the second light-transmitting substrate, and at least one light emitter disposed so as to be opposed to at least one of side surfaces of the first light-transmitting substrate and the second light-transmitting substrate.

In the display device described in JP-A-2018-021974, an image displayed using a light source is visible from one surface together with a background on the other surface side opposite to the one surface, and the image displayed using the light source is visible from the other surface together with a background on the one surface side opposite to the other surface. Therefore, the image is desired to be distinguishable as to from which side the image is viewed.

For the foregoing reasons, there is a need for a sensor-equipped display device allowing an image displayed using a light source to be viewed from one surface together with a background on the other surface side opposite to the one surface, and capable of detecting detection-target objects close to the one surface and the other surface.

SUMMARY

According to an aspect, a sensor-equipped display device includes: an array substrate; a counter substrate; a first sensor configured to detect a first detection-target object close to the counter substrate; and a second sensor configured to detect a second detection-target object close to the array substrate. A first background of the array substrate is viewed from outside the counter substrate, and a second background of the counter substrate is viewed from outside the array substrate.

DETAILED DESCRIPTION

Figure 1:
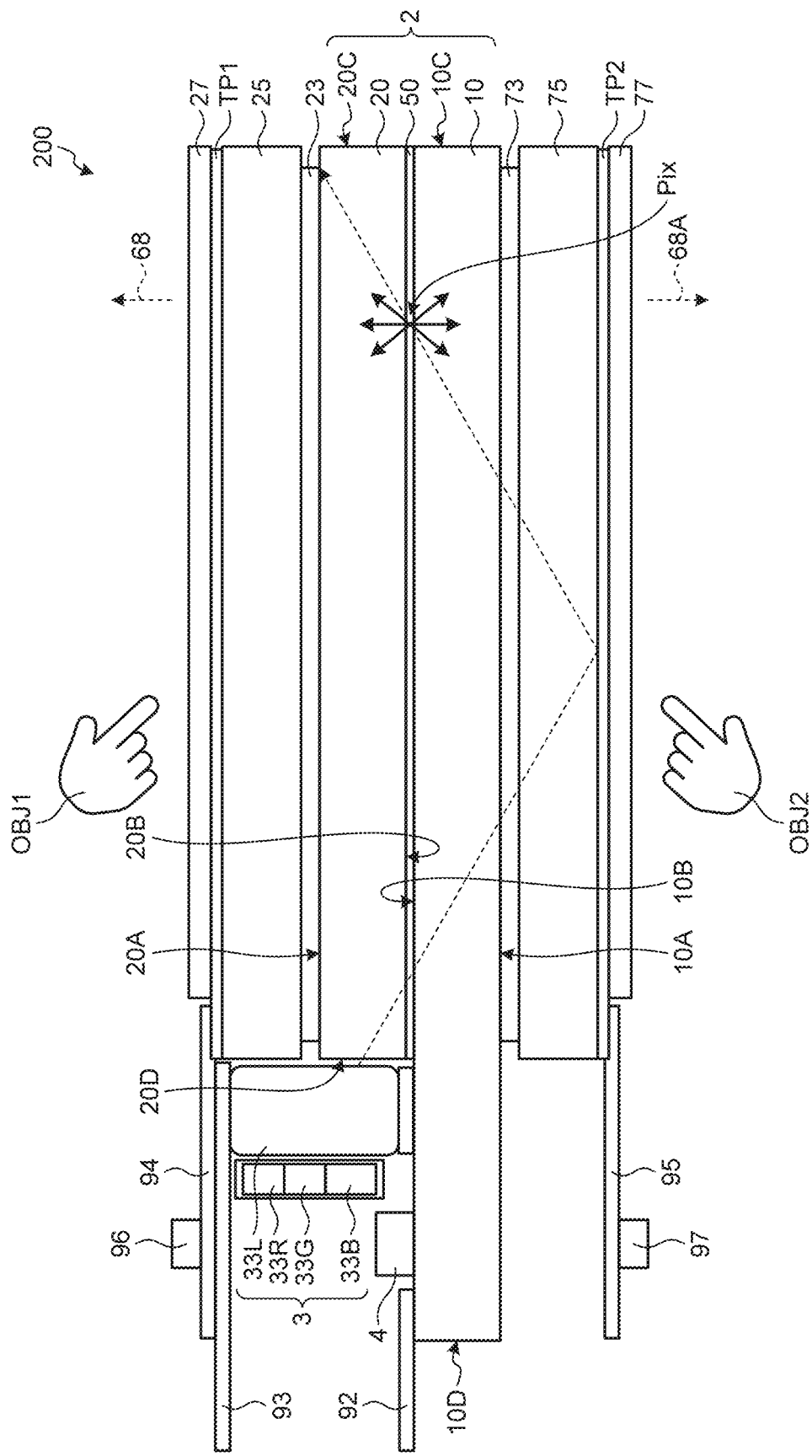
FIG. 1 is a sectional view illustrating an example of a display device according to a first embodiment.

The following describes forms (embodiments) for carrying out the present disclosure in detail with reference to the drawings. The present disclosure is not limited to the description of the embodiments given below. Components described below include those easily conceivable by those skilled in the art or those substantially identical thereto. Moreover, the components described below can be appropriately combined. What is disclosed herein is merely an example, and the present disclosure naturally encompasses appropriate modifications easily conceivable by those skilled in the art while maintaining the gist of the disclosure. To further clarify the description, widths, thicknesses, shapes, and the like of various parts are schematically illustrated in the drawings as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
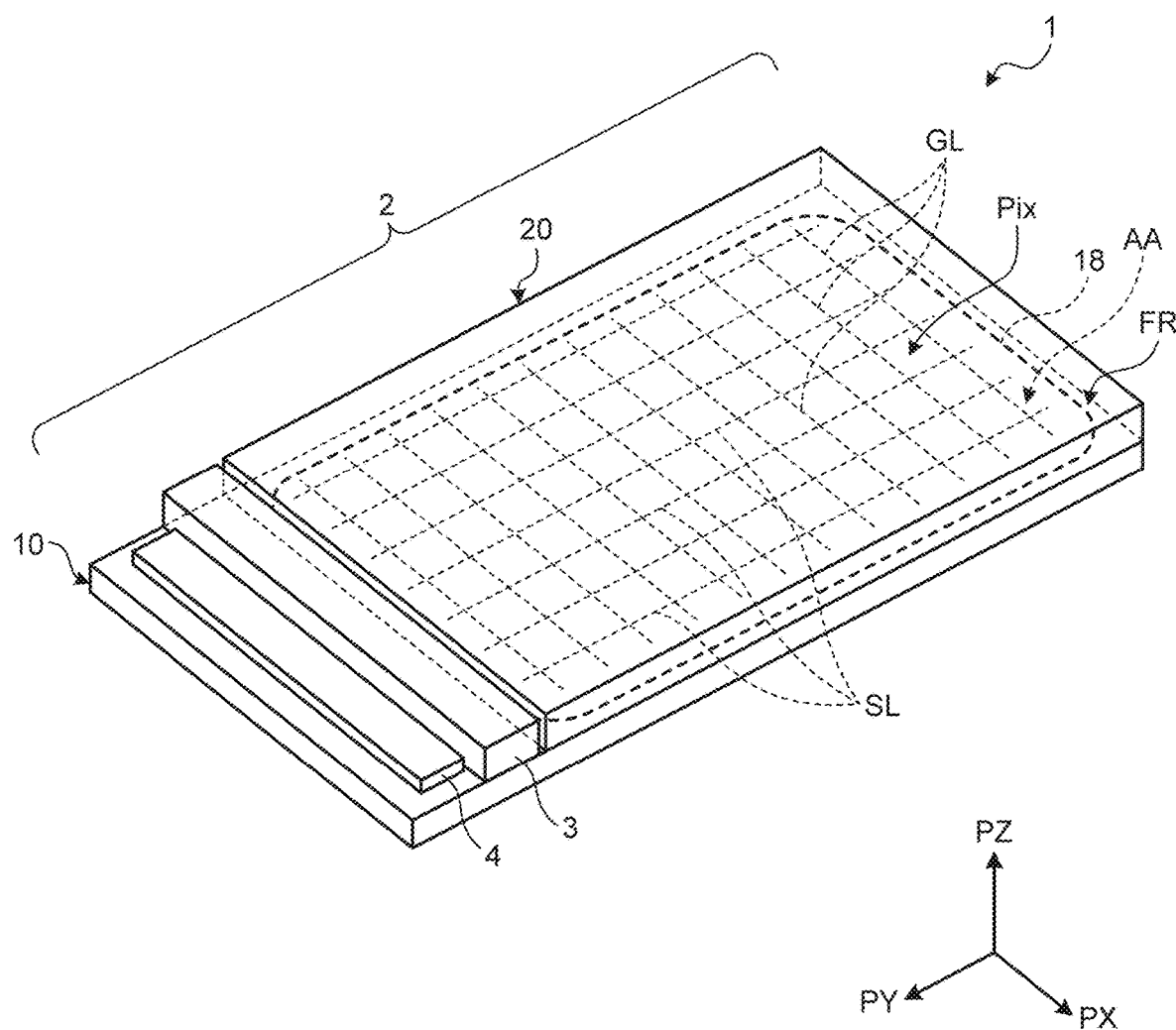
FIG. 2 is a perspective view illustrating an example of the display device according to the first embodiment.
Figure 3:
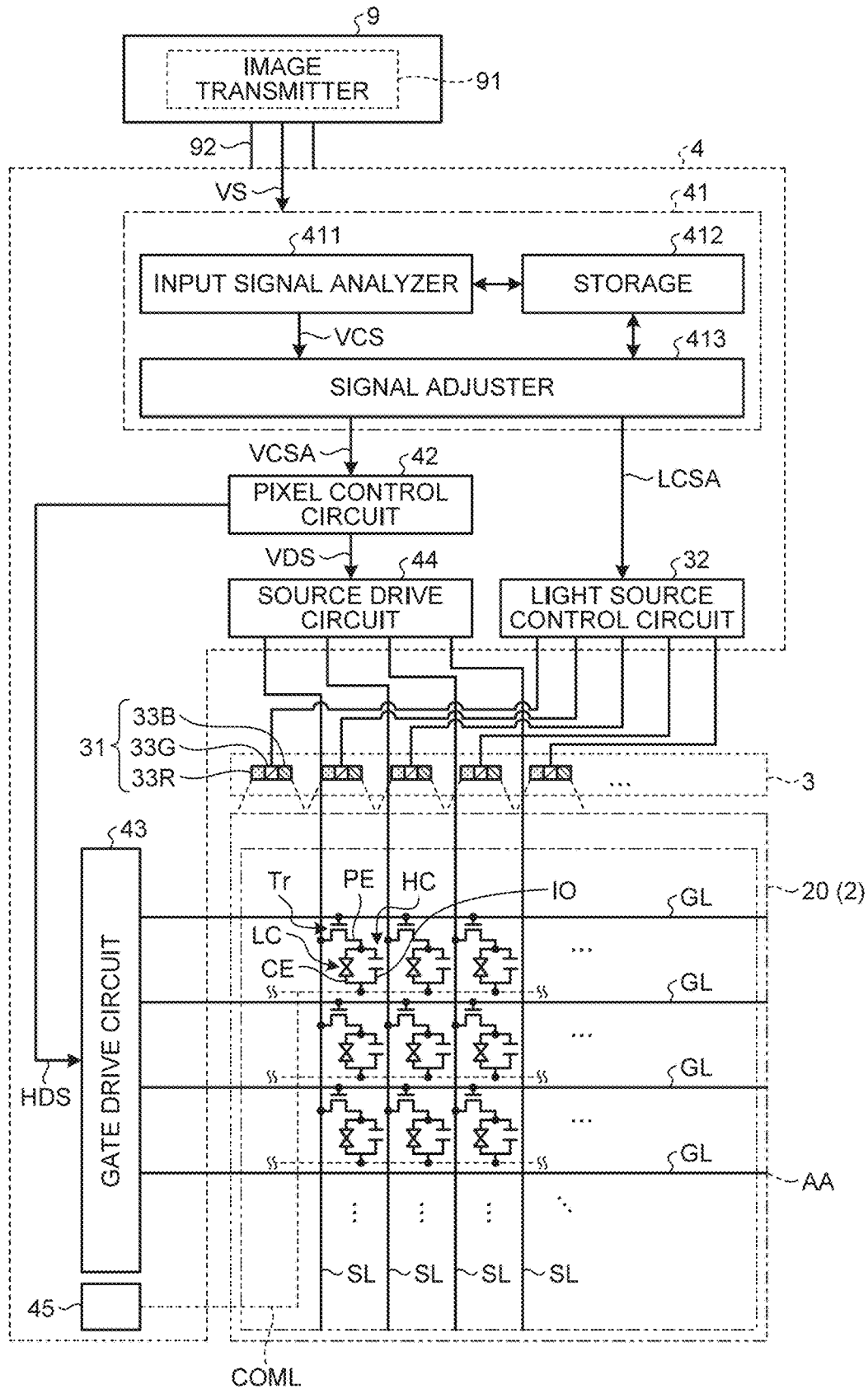
FIG. 3 is a block diagram illustrating the display device of the first embodiment.
Figure 4:
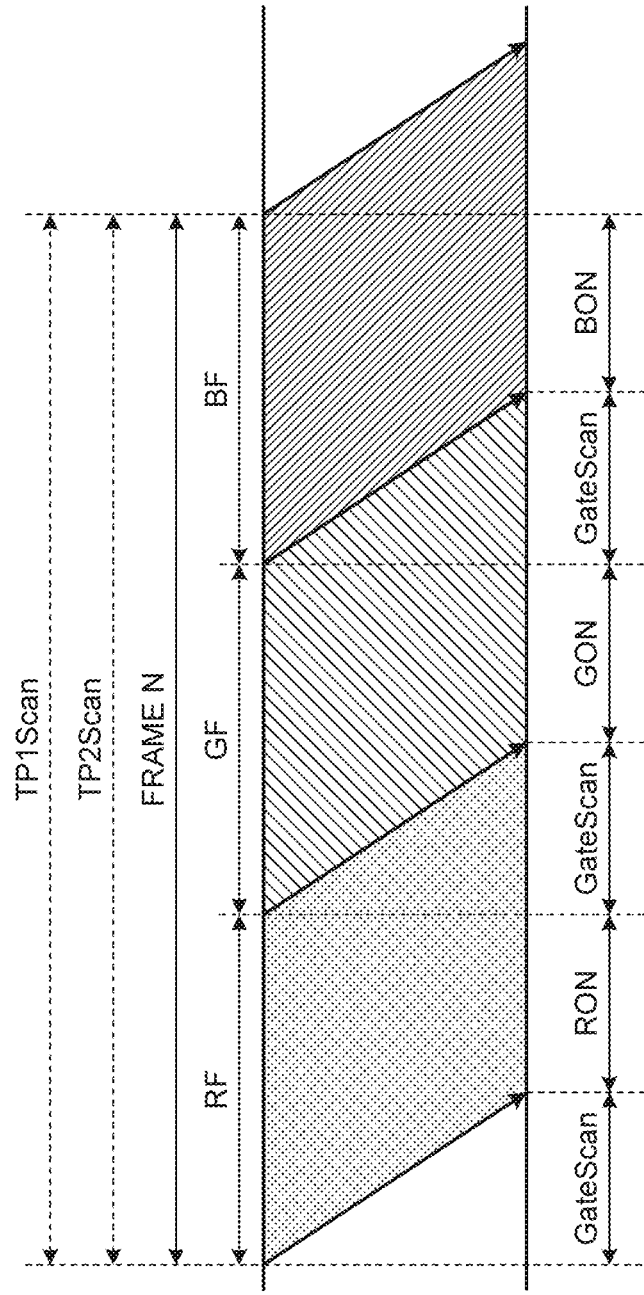
FIG. 4 is a timing diagram explaining timing of light emission by a light source in a field-sequential system of the first embodiment.
Figure 5:
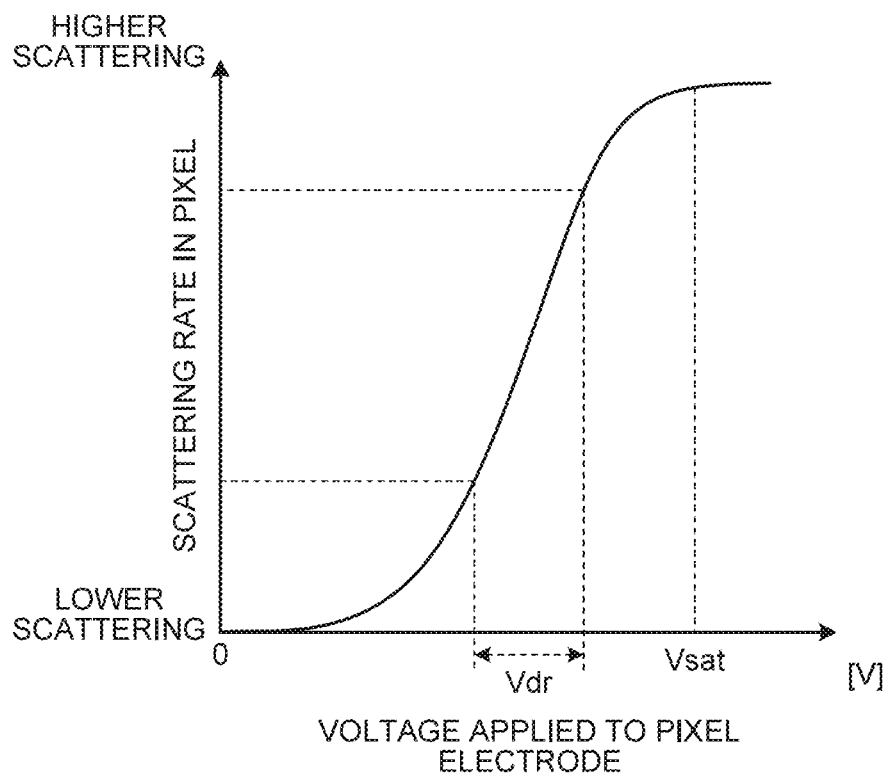
FIG. 5 is an explanatory diagram illustrating a relation between a voltage applied to a pixel electrode and a scattering state of a pixel.
Figure 6:
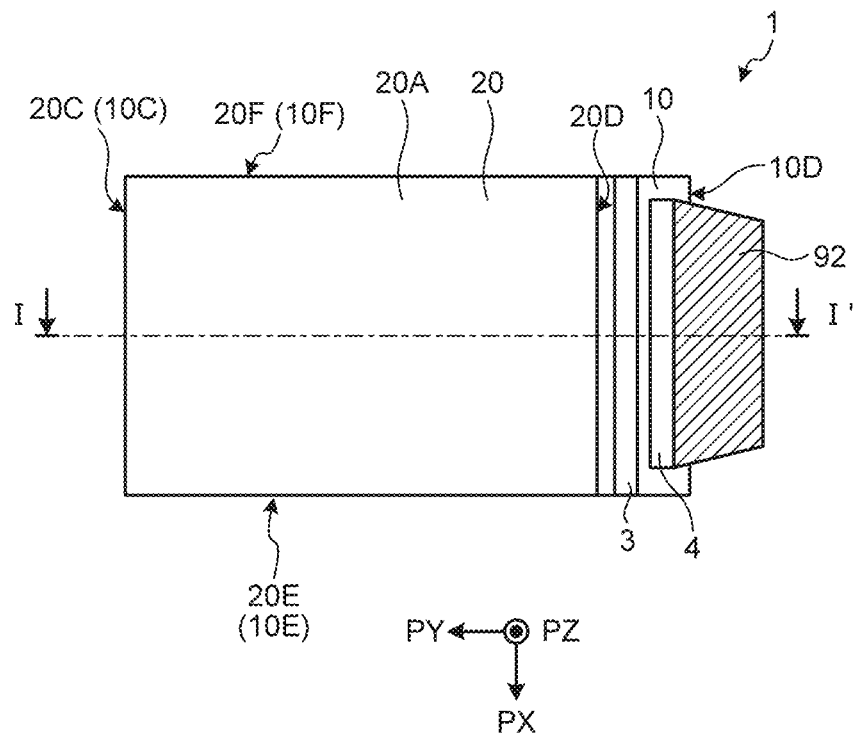
FIG. 6 is a plan view illustrating a planar surface of the display device.

FIG. 1 is a sectional view illustrating an example of a display device according to a first embodiment. FIG. 2 is a perspective view illustrating an example of the display device according to the present embodiment. FIG. 3 is a block diagram illustrating the display device of FIG. 2. FIG. 4 is a timing diagram explaining timing of light emission by a light source in a field-sequential system. FIG. 5 is an explanatory diagram illustrating a relation between a voltage applied to a pixel electrode and a scattering state of a pixel. FIG. 6 is a plan view illustrating a planar surface of the display device.

As illustrated in FIG. 1, a sensor-equipped display device 200 includes a display panel 2, a first sensor TP1, and a second sensor TP2. The first sensor TP1 is provided on one surface of a light-transmitting base member 25. The second sensor TP2 is provided on one surface of a light-transmitting base member 75.

The display panel 2 includes an array substrate 10, a counter substrate 20, and a liquid crystal layer 50. The counter substrate 20 is opposed to a surface of the array substrate 10 in a direction orthogonal thereto (in a PZ direction as indicated in FIG. 2). Polymer-dispersed liquid crystals (to be described later) are sealed in a liquid crystal layer LC by the array substrate 10, the counter substrate 20, and a sealing part 18.

As illustrated in FIGS. 1 and 6, the array substrate 10 has a first principal surface 10A, a second principal surface 10B, a first side surface 10C, a second side surface 10D, a third side surface 10E, and a fourth side surface 10F. The first principal surface 10A and the second principal surface 10B are parallel surfaces. The first side surface 10C and the second side surface 10D are parallel surfaces. The third side surface 10E and the fourth side surface 10F are parallel surfaces.

As illustrated in FIGS. 1 and 6, the counter substrate 20 has a first principal surface 20A, a second principal surface 20B, a first side surface 20C, a second side surface 20D, a third side surface 20E, and a fourth side surface 20F. The first principal surface 20A and the second principal surface 20B are parallel surfaces. The first side surface 20C and the second side surface 20D are parallel surfaces. The third side surface 20E and the fourth side surface 20F are parallel surfaces.

The base member 25 is bonded to the first principal surface 20A of the counter substrate 20 with an optical resin 23 interposed therebetween. The base member 75 is bonded to the first principal surface 10A of the array substrate 10 with an optical resin 73 interposed therebetween. The base member 25 is a protective substrate for the counter substrate 20 and is formed of, for example, glass or a light-transmitting resin. The base member 25 is also called a cover glass when being formed of glass. The base member 25 may be flexible when being formed of a light-transmitting resin.

The first sensor TP1 detects contact or proximity of a first detection-target object OBJ1 located on one side of the sensor-equipped display device 200. The first sensor TP1 is formed on a surface of the base member 25 located on a side opposite to a surface to which the display panel 2 is bonded. The outside of the first sensor TP1 is covered with a protective layer 27. Since the first sensor TP1 is covered with the protective layer 27, a material forming the first sensor TP1 is difficult to scatter even if physical impact is externally applied to the sensor-equipped display device 200.

A detection signal of the first sensor TP1 is supplied to a sensor detection circuit 96 through a flexible substrate (flexible printed circuit (FPC) board) 94, and a report signal processed by the sensor detection circuit 96 is externally output through the flexible substrate 94.

The second sensor TP2 detects contact or proximity of a second detection-target object OBJ2 located on the other side of the sensor-equipped display device 200. The second sensor TP2 is formed on a surface of the base member 75 opposite to a surface to which the display panel 2 is bonded. The outside of the second sensor TP2 is covered with a protective layer 77. Since the second sensor TP2 is covered with the protective layer 77, a material forming the second sensor TP2 is difficult to scatter even if physical impact is externally applied to the sensor-equipped display device 200. The base member 75 is the same protective substrate as the base member 25 and is a protective substrate for the array substrate 10. The base member 75 is formed of, for example, glass or a light-transmitting resin. The base member 75 is also called a cover glass when being formed of glass. The base member 75 may be flexible when being formed of a light-transmitting resin.

A detection signal of the second sensor TP2 is supplied to a sensor detection circuit 97 through a flexible substrate (flexible printed circuit (FPC) board) 95, and a report signal processed by the sensor detection circuit 97 is externally output through the flexible substrate 95.

The protective layer 77 and the protective layer 27 each include a light-transmitting resin layer having a refractive index smaller than that of the base member 75 and the base member 25, and reduce reflection when viewed from outside by a viewer. The protective layer 77 and the protective layer 27 preferably further include a material that absorbs ultraviolet light.

A light source 3 includes a light emitter 33R of a first color (such as red), a light emitter 33G of a second color (such as green), a light emitter 33B of a third color (such as blue), and a lens 33L. The lens 33L emits light emitted by the light emitter 33R of the first color, the light emitter 33G of the second color, and the light emitter 33B of the third color to the second side surface 20D of the counter substrate 20 and a side surface of the base member 25. The light source 3 is mounted on the second principal surface 10B of the array substrate 10, and the following description will be made based on this embodiment. However, the light source 3 is not limited to this example and may be mounted on the first principal surface 10A of the array substrate 10 and emit the light to a side surface of a first base member 75.

As illustrated in FIG. 2, a display device 1, which is included in the sensor-equipped display device 200, includes the display panel 2, the light source 3, and a drive circuit 4. A PX direction denotes one direction on the plane of the display panel 2. A second direction PY denotes a direction orthogonal to the PX direction. A third direction PZ denotes a direction orthogonal to a PX-PY plane.

As illustrated in FIG. 2, the display panel 2 has a display region AA capable of displaying images and a peripheral region FR outside the display region AA. A plurality of pixels Pix are arranged in a matrix having a row-column configuration in the display region AA. In the present disclosure, a row refers to a pixel row including m pixels Pix arranged in one direction, and a column refers to a pixel column including n pixels Pix arranged in a direction orthogonal to the direction in which the rows extend. The values of m and n are defined depending on a display resolution in the vertical direction and a display resolution in the horizontal direction. A plurality of scanning lines GL are provided corresponding to the rows, and a plurality of signal lines SL are provided corresponding to the columns.

The light source 3 includes a plurality of light emitters 31. As illustrated in FIG. 3, a light source controller (light source control circuit) 32 is included in the drive circuit 4. The light source controller 32 may be a circuit separate from the drive circuit 4. The light emitters 31 are electrically coupled to the light source controller 32 through wiring in the array substrate 10.

As illustrated in FIG. 2, the drive circuit 4 is fixed to the surface of the array substrate 10. As illustrated in FIG. 3, the drive circuit 4 includes a signal processing circuit 41, a pixel control circuit 42, a gate drive circuit 43, a source drive circuit 44, and a common potential drive circuit 45. The array substrate 10 has an area larger than that of the counter substrate 20 in an X-Y plane, and the drive circuit 4 is provided on a projecting portion of the array substrate 10 exposed from the counter substrate 20.

The signal processing circuit 41 receives an input signal (such as a red-green-blue (RGB) signal) VS from an image transmitter 91 of an external host controller 9 through a flexible substrate 92.

The signal processing circuit 41 includes an input signal analyzer 411, a storage 412, and a signal adjuster 413. The input signal analyzer 411 generates a second input signal VCS based on an externally received first input signal VS.

The second input signal VCS is a signal for determining a gradation value to be given to each of the pixels Pix of the display panel 2 based on the first input signal VS. In other words, the second input signal VCS is a signal including gradation information on the gradation value of each of the pixels Pix.

The signal adjuster 413 generates a third input signal VCSA from the second input signal VCS. The signal adjuster 413 transmits the third input signal VCSA to the pixel control circuit 42, and transmits a light source control signal LCSA to the light source controller 32. The light source control signal LCSA is a signal including information on light quantities of the light emitters 31 set in accordance with, for example, input gradation values given to the pixels Pix. For example, the light quantities of the light emitters 31 are set smaller when a darker image is displayed, and set larger when a brighter image is displayed.

The pixel control circuit 42 generates a horizontal drive signal HDS and a vertical drive signal VDS based on the third input signal VCSA. In the present embodiment, since the display device 1 is driven by the field-sequential system, the horizontal drive signal HDS and the vertical drive signal VDS are generated for each color emittable by the light emitter 31.

The gate drive circuit 43 sequentially selects the scanning lines GL of the display panel 2 based on the horizontal drive signal HDS during one vertical scanning period. The scanning lines GL can be selected in any order.

The source drive circuit 44 supplies a gradation signal according to the output gradation value of each of the pixels Pix to a corresponding one of the signal lines SL of the display panel 2 based on the vertical drive signal VDS during one horizontal scanning period.

In the present embodiment, the display panel 2 is an active-matrix panel. Hence, the display panel 2 has the signal (source) lines SL extending in the second direction PY and the scanning (gate) lines GL extending in the first direction PX in a plan view, and has switching elements Tr at intersecting portions between the signal lines SL and the scanning lines GL.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a multi-gate transistor such as a double-gate transistor. One of the source electrode and the drain electrode of the switching element Tr is coupled to a corresponding one of the signal lines SL, and the gate electrode of the switching element Tr is coupled to a corresponding one of the scanning lines GL. The other of the source electrode and the drain electrode is coupled to one end of a capacitor (to be described later) of the polymer-dispersed liquid crystal layer LC. The capacitor of the polymer-dispersed liquid crystal layer LC is coupled at one end thereof to the switching element Tr through a pixel electrode PE, and coupled at the other end thereof to common potential wiring COML through a common electrode CE. A holding capacitance HC is generated between the pixel electrode PE and a holding capacitance electrode IO electrically coupled to the common potential wiring COML. A potential of the common potential wiring COML is supplied by the common potential drive circuit 45.

Each of the light emitters 31 includes a light emitter 33R of a first color (such as red), a light emitter 33G of a second color (such as green), and a light emitter 33B of a third color (such as blue). The light source controller 32 controls the light emitter 33R of the first color, the light emitter 33G of the second color, and the light emitter 33B of the third color so as to emit light in a time-division manner based on the light source control signal LCSA. In this manner, the light emitter 33R of the first color, the light emitter 33G of the second color, and the light emitter 33B of the third color are driven based on the field-sequential system.

As illustrated in FIG. 4, in a first sub-frame (first predetermined time) RF, the light emitter 33R of the first color emits light during a first color light emission period RON, and the pixels Pix selected during one vertical scanning period GateScan scatter light to perform display. On the entire display panel 2, for the pixels Pix selected during one vertical scanning period GateScan, if the gradation signal corresponding to the output gradation value of each of the pixels Pix is supplied to the above-described signal lines SL, only the first color is lit up during the first color light emission period RON.

Then, in a second sub-frame (second predetermined time) GF, the light emitter 33G of the second color emits light during a second color light emission period GON, and the pixels Pix selected during the one vertical scanning period GateScan scatter light to perform display. On the entire display panel 2, for the pixels Pix selected during one vertical scanning period GateScan, if the gradation signal corresponding to the output gradation value of each of the pixels Pix is supplied to the above-described signal lines SL, only the second color is lit up during the second color light emission period GON.

Further, in a third sub-frame (third predetermined time) BF, the light emitter 33B of the third color emits light during a third color light emission period BON, and the pixels Pix selected during the one vertical scanning period GateScan scatter light to perform display. On the entire display panel 2, for the pixels Pix selected during one vertical scanning period GateScan, if the gradation signal corresponding to the output gradation value of each of the pixels Pix is supplied to the above-described signal lines SL, only the third color is lit up during the third color light emission period BON.

Since a human eye has limited temporal resolving power and produces an afterimage, an image with a combination of three colors is recognized in a period of one frame (1F). The field-sequential system can eliminate the need for a color filter, and thus can reduce an absorption loss by the color filter. As a result, higher transmittance can be obtained. In the color filter system, one pixel is made up of sub-pixels obtained by dividing each of the pixels Pix into the sub-pixels of the first color, the second color, and the third color. In contrast, in the field-sequential system, the pixel need not be divided into the sub-pixels in such a manner. A fourth sub-frame may be further included to emit light in a fourth color different from any one of the first color, the second color, and the third color.

Figure 7:
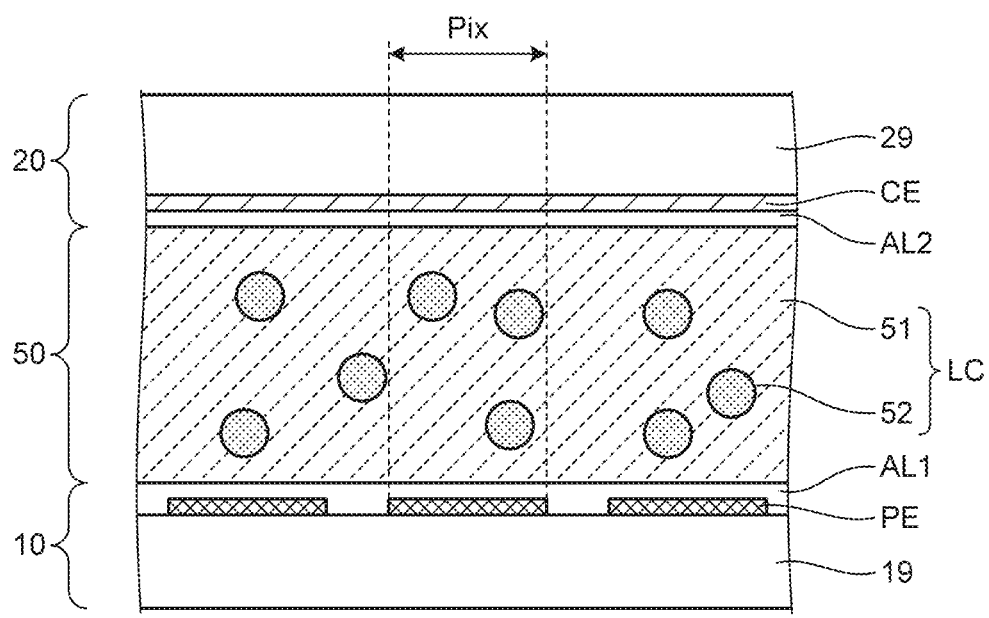
FIG. 7 is an enlarged sectional view obtained by enlarging a liquid crystal layer portion of FIG. 1.
Figure 8:
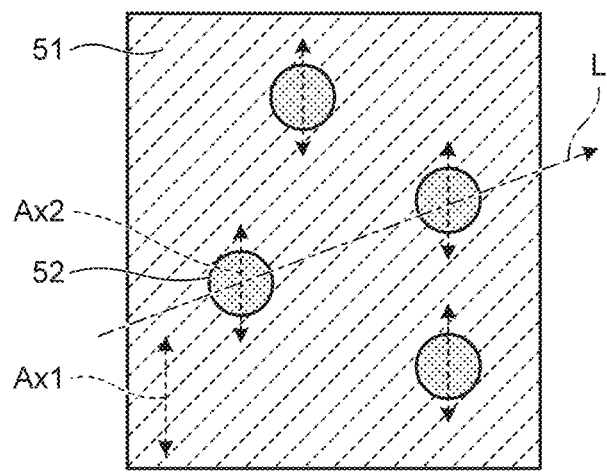
FIG. 8 is a sectional view for explaining a non-scattering state in the liquid crystal layer.
Figure 9:
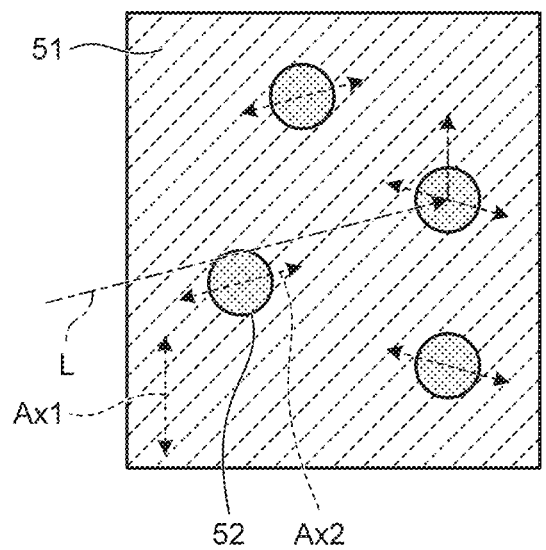
FIG. 9 is a sectional view for explaining the scattering state in the liquid crystal layer.

FIG. 7 is an enlarged sectional view obtained by enlarging the liquid crystal layer portion of FIG. 1. FIG. 8 is a sectional view for explaining a non-scattering state in the liquid crystal layer. FIG. 9 is a sectional view for explaining the scattering state in the liquid crystal layer.

For the pixels Pix selected during one vertical scanning period GateScan, if the gradation signal corresponding to the output gradation value of each of the pixels Pix is supplied to the above-described signal lines SL, a voltage applied to the pixel electrode PE changes with the gradation signal. The change in the voltage applied to the pixel electrode PE changes the voltage between the pixel electrode PE and the common electrode CE. The scattering state of the liquid crystal layer 50 for each of the pixels Pix is controlled in accordance with the voltage applied to the pixel electrode PE, and the scattering rate in the pixels Pix changes, as illustrated in FIG. 5.

As illustrated in FIG. 5, the change in the scattering rate in the pixel Pix is smaller when the voltage applied to the pixel electrode PE is equal to or higher than a saturation voltage Vsat. Therefore, the drive circuit 4 changes the voltage applied to the pixel electrode PE in accordance with the vertical drive signal VDS in a voltage range Vdr lower than the saturation voltage Vsat.

As illustrated in FIG. 1, the light source 3 is opposed to the second side surface 20D of the counter substrate 20. The light source 3 is sometimes called a side light source. As illustrated in FIG. 1, the light source 3 emits light-source light L to the second side surface 20D of the counter substrate 20. The second side surface 20D of the counter substrate 20 opposed to the light source 3 serves as a plane of light incidence.

As illustrated in FIG. 1, the light-source light L emitted from the light source 3 propagates in a direction (second direction PY) away from the second side surface 20D while being reflected by the base member 25, the first principal surface 10A of the array substrate 10, the first principal surface 20A of the counter substrate 20, or the base member 75. When the light-source light L travels outward from the first principal surface 10A of the array substrate 10 or the first principal surface 20A of the counter substrate 20, the light-source light L enters a medium having a lower refractive index from a medium having a higher refractive index. Hence, if the angle of incidence of the light-source light L incident on the first principal surface 10A of the array substrate 10 or the first principal surface 20A of the counter substrate 20 is larger than a critical angle, the light-source light L is fully reflected by the first principal surface 10A of the array substrate 10 or the first principal surface 20A of the counter substrate 20.

As illustrated in FIG. 1, the light-source light L that has propagated in the array substrate 10 and the counter substrate 20 is scattered by any of the pixels Pix including liquid crystals placed in the scattering state, and the angle of incidence of the scattered light becomes an angle smaller than the critical angle. Thus, emission light 68 or 68A is emitted outward from the first principal surface 20A of the counter substrate 20 or the first principal surface 10A of the array substrate 10. The emission light 68 or 68A emitted outward from the first principal surface 20A of the counter substrate 20 or the first principal surface 10A of the array substrate 10 is viewed by the viewer. The following describes the polymer-dispersed liquid crystals placed in the scattering state and the polymer-dispersed liquid crystals in the non-scattering state, using FIGS. 7 to 9.

As illustrated in FIG. 7, the array substrate 10 is provided with a first orientation film AL1, and the counter substrate 20 is provided with a second orientation film AL2. The first and the second orientation films AL1 and AL2 are, for example, vertical orientation films.

A solution containing the liquid crystals and a monomer is filled between the array substrate 10 and the counter substrate 20. Then, in a state where the monomer and the liquid crystals are oriented by the first and the second orientation films AL1 and AL2, the monomer is polymerized by ultraviolet rays or heat to form a bulk 51. This process forms the liquid crystal layer LC including reverse-mode polymer-dispersed liquid crystals in which the liquid crystals are dispersed in gaps of a polymer network formed in a mesh shape.

In this manner, the polymer-dispersed liquid crystals contain the bulk 51 formed of the polymer and a plurality of fine particles 52 dispersed in the bulk 51. The fine particles 52 are formed of the liquid crystals. Both the bulk 51 and the fine particles 52 have optical anisotropy.

The orientation of the liquid crystals included in the fine particles 52 is controlled by a voltage difference between the pixel electrode PE and the common electrode CE. The orientation of the liquid crystals is changed by the voltage applied to the pixel electrode PE. The degree of scattering of light passing through the pixels Pix changes with change in the orientation of the liquid crystals.

For example, as illustrated in FIG. 8, when no voltage is applied between the pixel electrode PE and the common electrode CE, the direction of an optical axis Ax1 of the bulk 51 is equal to the direction of an optical axis Ax2 of the fine particles 52. The optical axis Ax2 of the fine particles 52 is parallel to the PZ direction of the liquid crystal layer 50. The optical axis Ax1 of the bulk 51 is parallel to the PZ direction of the liquid crystal layer 50 regardless of whether a voltage is applied.

Ordinary-ray refractive indices of the bulk 51 and the fine particles 52 are equal to each other. When no voltage is applied between the pixel electrode PE and the common electrode CE, the difference of refractive index between the bulk 51 and the fine particles 52 is zero in all directions. The liquid crystal layer 50 is placed in the non-scattering state of not scattering the light-source light L. The light-source light L propagates in a direction away from the light source 3 (the light emitter 31) while being reflected by the first principal surface 10A of the array substrate 10 and the first principal surface 20A of the counter substrate 20. When the liquid crystal layer 50 is in the non-scattering state of not scattering the light-source light L, a background on the first principal surface 20A side of the counter substrate 20 is visible from the first principal surface 10A of the array substrate 10, and a background on the first principal surface 10A side of the array substrate 10 is visible from the first principal surface 20A of the counter substrate 20.

As illustrated in FIG. 9, in the space between the pixel electrode PE and the common electrode CE having a voltage applied thereto, the optical axis Ax2 of the fine particles 52 is inclined by an electric field generated between the pixel electrode PE and the common electrode CE. Since the optical axis Ax1 of the bulk 51 is not changed by the electric field, the direction of the optical axis Ax1 of the bulk 51 differs from the direction of the optical axis Ax2 of the fine particles 52. The light-source light L is scattered in the pixel Pix including the pixel electrode PE having a voltage applied thereto. As described above, the viewer views a part of the scattered light-source light L emitted outward from the first principal surface 10A of the array substrate 10 or the first principal surface 20A of the counter substrate 20.

In the pixel Pix including the pixel electrode PE having no voltage applied thereto, the background on the first principal surface 20A side of the counter substrate 20 is visible from the first principal surface 10A of the array substrate 10, and the background on the first principal surface 10A side of the array substrate 10 is visible from the first principal surface 20A of the counter substrate 20. In the display device 1 of the present embodiment, when the first input signal VS is input from the image transmitter 91, a voltage is applied to the pixel electrode PE of the pixel Pix for displaying an image, and the image based on the third input signal VCSA becomes visible together with the background. In this manner, an image is displayed in the display region when the polymer-dispersed liquid crystals are in a scattering state.

The light-source light L is scattered in the pixel Pix including the pixel electrode PE having a voltage applied thereto, and emitted outward to display the image, which is displayed so as to be superimposed on the background. In other words, the display device 1 of the present embodiment combines the emission light 68 or the emission light 68A with the background to display the image so as to be superimposed on the background.

Figure 10:
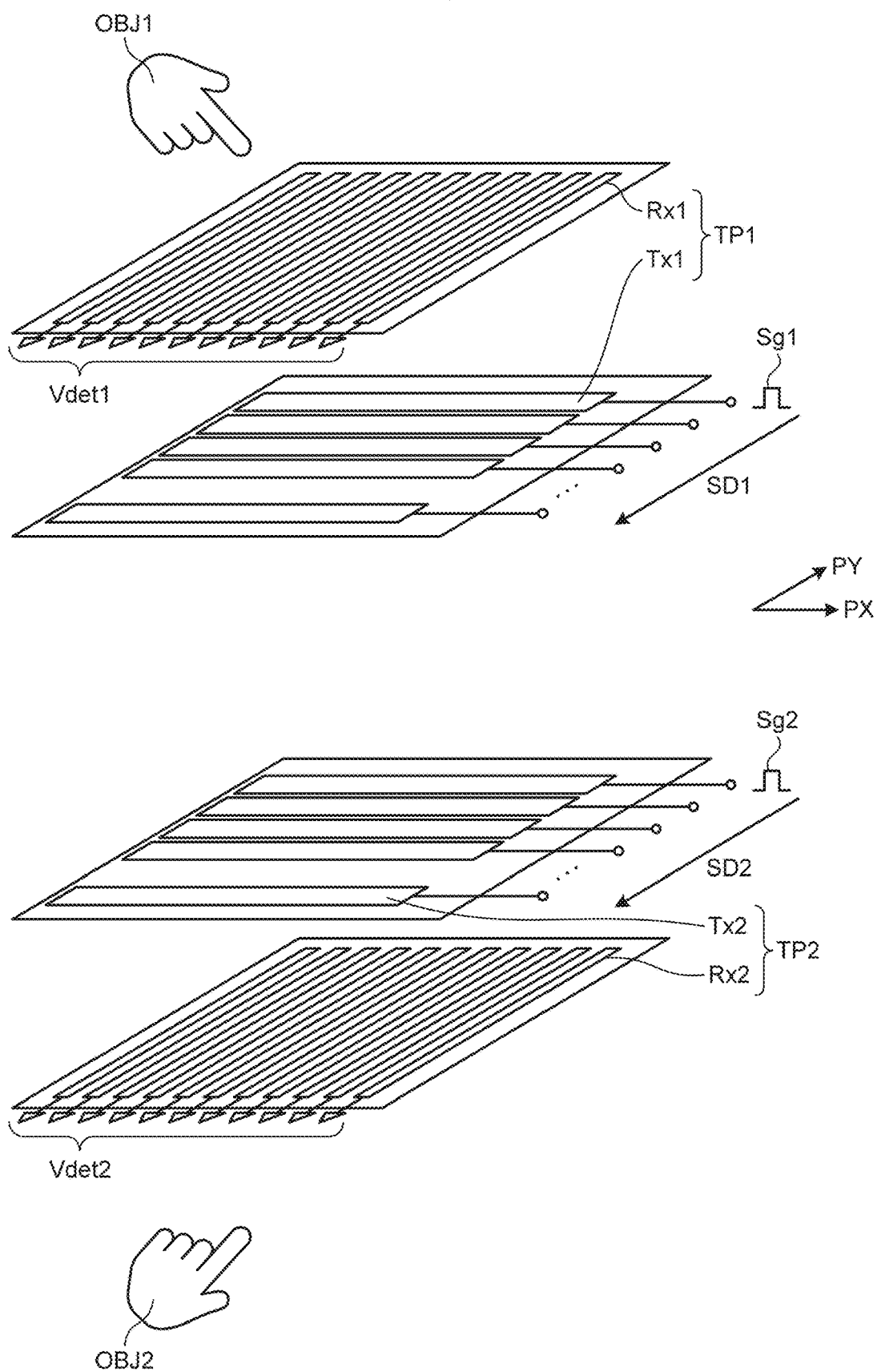
FIG. 10 is an explanatory diagram illustrating configurations of a first sensor and a second sensor.

FIG. 10 is an explanatory diagram illustrating configurations of the first sensor and the second sensor. As illustrated in FIG. 10, the first sensor TP1 includes first electrodes Rx1 extending in the first direction PX and second electrodes Tx1 extending in the second direction PY. A predetermined capacitor is formed at an intersection portion where the first electrode Rx1 intersects the second electrode Tx1 in the plan view. When an alternating-current rectangular wave Sg1 having a predetermined frequency is applied to the second electrode Tx1, a current corresponding to a capacitance value flows along with charge and discharge of the capacitor at the intersection portion. A detection signal Vdet1 corresponding to this current is output from the first electrode Rx1. The first sensor TP1 detects what is called mutual capacitance.

When the first detection-target object OBJ1 comes close to the first sensor TP1, capacitance is generated by the first detection-target object OBJ1 and the first electrode Rx1. As a result, the capacitor at the intersection portion where the first electrode Rx1 intersects the second electrode Tx1 works at a lower level than when the first detection-target object OBJ1 is not present. Therefore, when the first detection-target object OBJ1 comes close to the first sensor TP1, the wave height value of the detection signal Vdet1 decreases to a smaller value than that when the first detection-target object OBJ1 is not present.

The alternating-current rectangular wave Sg1 is applied to the second electrodes Tx1 in a sequential manner in a scanning direction SD1. The intersection portions where the first electrodes Rx1 intersect the second electrodes Tx1 are arranged in a matrix having a row-column configuration in the plan view. The place where the wave height value of the detection signal Vdet1 is smaller is the position of the first detection-target object OBJ1 detected on the first sensor TP1.

In the same manner, the second sensor TP2 includes first electrodes Rx2 extending in the first direction PX and second electrodes Tx2 extending in the second direction PY. A predetermined capacitor is formed at an intersection portion where the first electrode Rx2 intersects the second electrode Tx2 in the plan view. When an alternating-current rectangular wave Sg2 having a predetermined frequency is applied to the second electrode Tx2, a current corresponding to a capacitance value flows along with charge and discharge of the capacitor at the intersection portion. A detection signal Vdet2 corresponding to this current is output from the first electrode Rx2. The second sensor TP2 detects what is called mutual capacitance.

When the second detection-target object OBJ2 comes close to the second sensor TP2, capacitance is generated by the second detection-target object OBJ2 and the first electrode Rx2. As a result, the capacitor at the intersection portion where the first electrode Rx2 intersects the second electrode Tx2 works at a lower level than when the second detection-target object OBJ2 is not present. Therefore, when the second detection-target object OBJ2 comes close to the second sensor TP2, the wave height value of the detection signal Vdet2 decreases to a smaller value than that when the second detection-target object OBJ2 is not present.

The alternating-current rectangular wave Sg2 is applied to the second electrodes Tx2 in sequential a manner in a scanning direction SD2. The intersection portions where the first electrodes Rx2 intersect the second electrodes Tx2 are arranged in a matrix having a row-column configuration in the plan view. The place where the wave height value of the detection signal Vdet2 is smaller is the position of the second detection-target object OBJ2 detected on the second sensor TP2.

As illustrated in FIG. 4, since the first sensor TP1 is difficult to affect the display, any timing in one frame N including the first sub-frame RF, the second sub-frame GF, and the third sub-frame BF can be set as a first detection period TP1Scan as appropriate. In the same manner, for the second sensor TP2, any timing in the one frame N can be set as a second detection period TP2Scan as appropriate.

For example, by setting the frequency of the report signals of one of the first sensor detection circuit 96 and the second sensor detection circuit 97 illustrated in FIG. 1 higher than the frequency of the report signals of the other thereof, one of the first sensor TP1 and the second sensor TP2 is mainly used for detection and the other thereof is used for complementary detection. This configuration can reduce the power consumption of the sensor-equipped display device 200.

Figure 11:
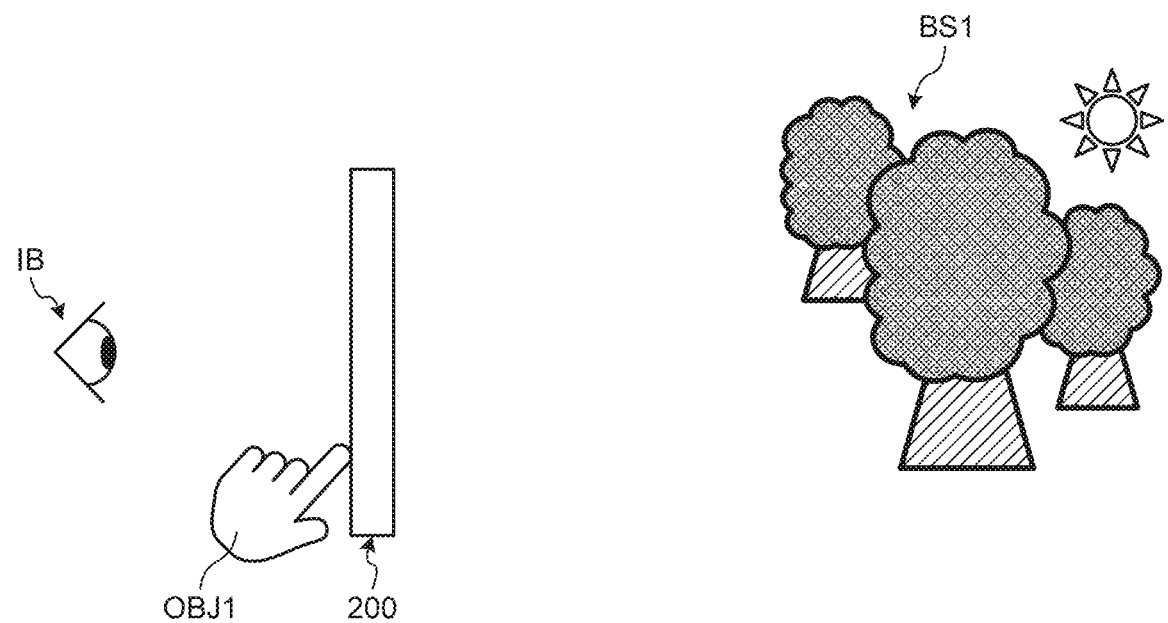
FIG. 11 is an explanatory diagram explaining a relation between a viewer and a first background, the viewer viewing the first background from one surface, the first background being located on the other surface side opposite to the one surface side.
Figure 12:
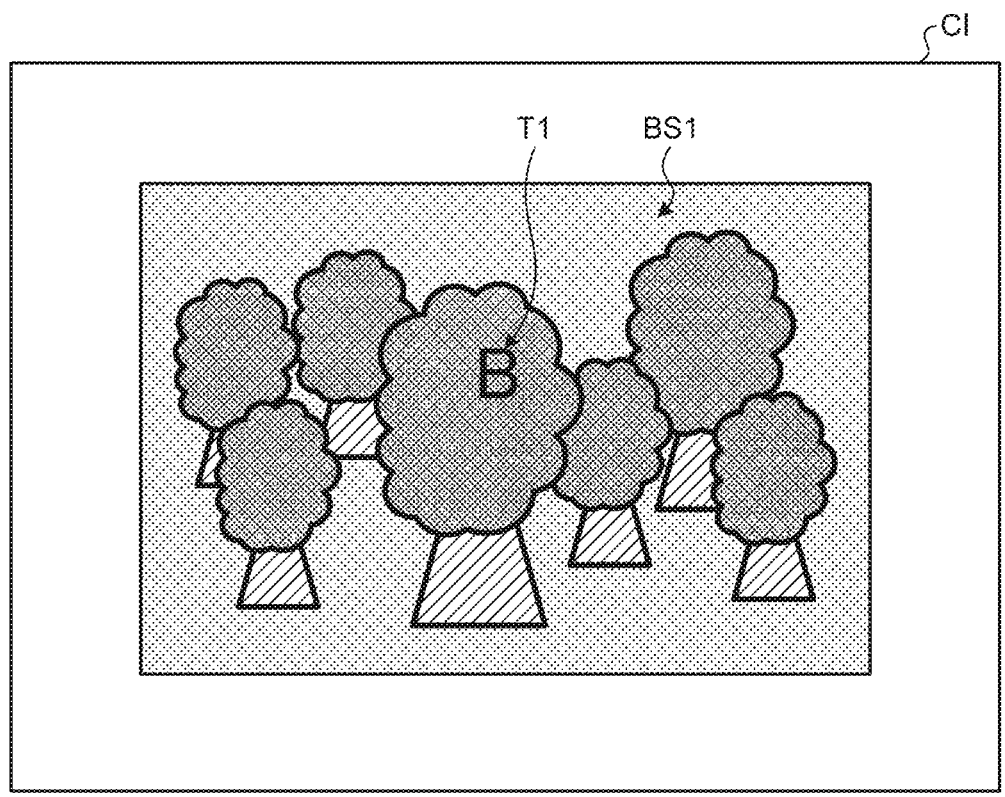
FIG. 12 is an explanatory diagram explaining an example in which an image is displayed so as to overlap the first background.

FIG. 11 is an explanatory diagram explaining a relation between the viewer and a first background, the viewer viewing the first background from one surface, the first background being located on the other surface side opposite to the one surface side. FIG. 12 is an explanatory diagram explaining an example in which an image is displayed so as to overlap the first background. As illustrated in FIG. 11, when a viewer IB views the other side from the one side of the sensor-equipped display device 200, a portion of the body of the viewer IB serves as the first detection-target object OBJ1.

As illustrated in FIG. 12, for example, an image T1 is displayed together with a first background BS1 illustrated in FIG. 11 on a display surface CI of the sensor-equipped display device 200. The image T1 is displayed so as to be recognizable on a side where the first detection-target object OBJ1 is detected by the first sensor TP1 (refer to FIG. 1).

Figure 13:
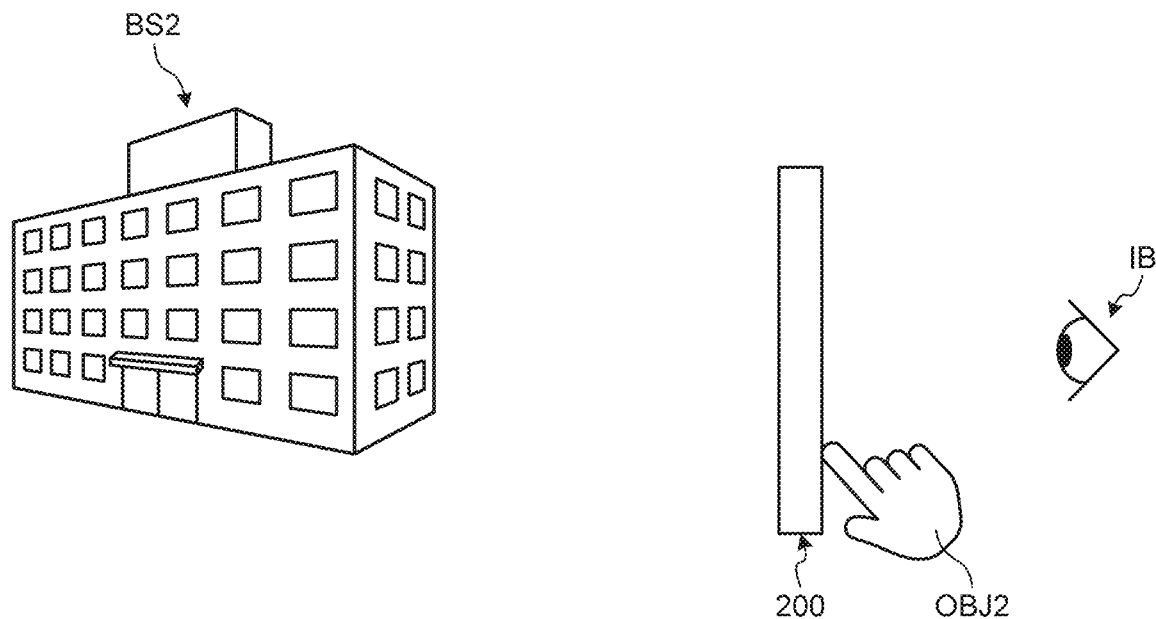
FIG. 13 is an explanatory diagram explaining a relation between a viewer and a second background, the viewer viewing the second background from the other surface, the second background being located on the one surface side opposite to the other surface side.
Figure 14:
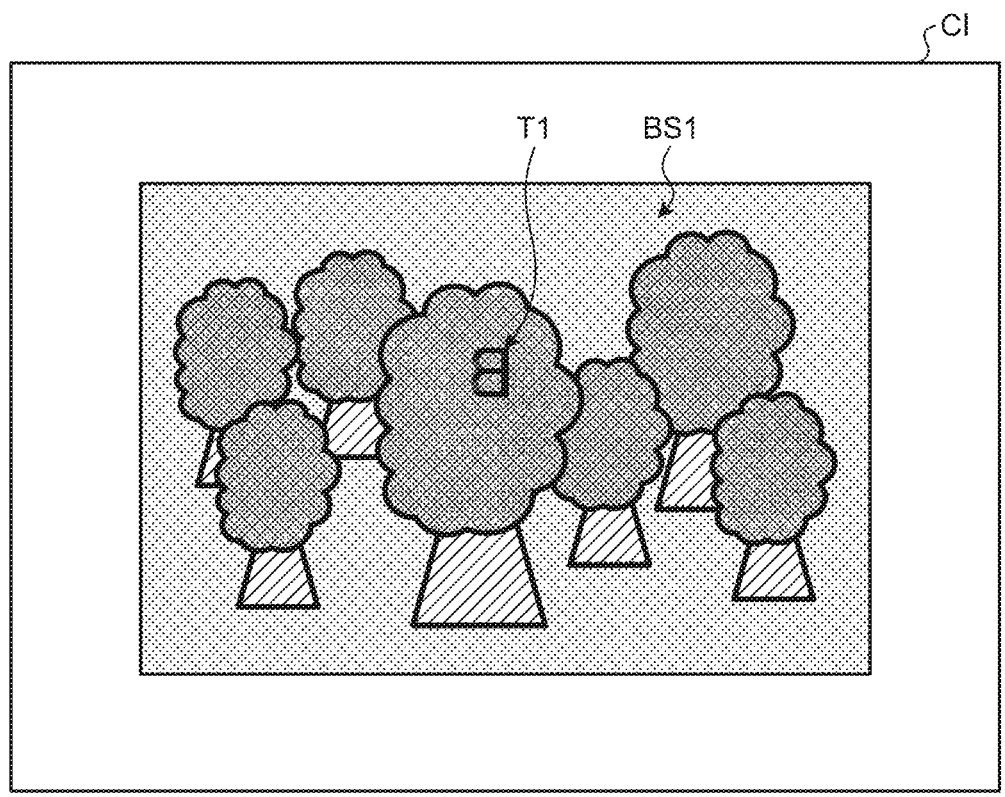
FIG. 14 is an explanatory diagram explaining an example in which an inverted image is displayed so as to overlap the first background.

FIG. 13 is an explanatory diagram explaining a relation between the viewer and a second background, the viewer viewing the second background from the other surface, the second background being located on the one surface side opposite to the other surface side. FIG. 14 is an explanatory diagram explaining an example in which an inverted image is displayed so as to overlap the first background. As illustrated in FIG. 13, when the viewer IB views the one side from the other side of the sensor-equipped display device 200, a portion of the body of the viewer IB serves as the second detection-target object OBJ2.

Figure 15:
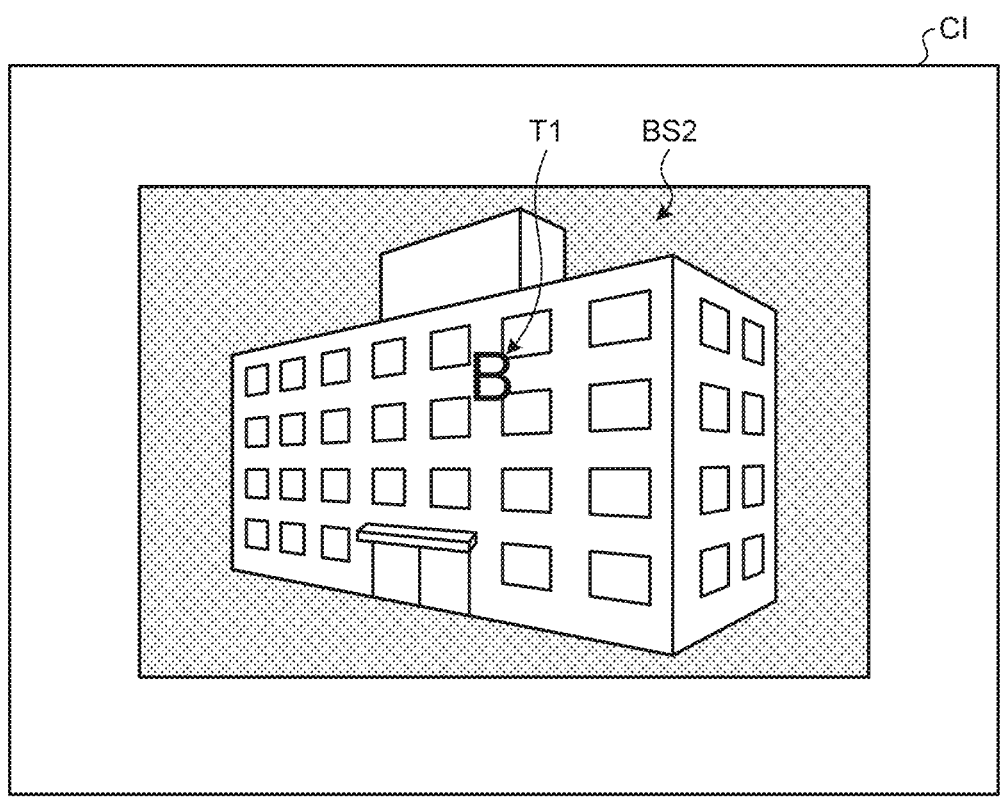
FIG. 15 is an explanatory diagram explaining an example in which the image is displayed so as to overlap the second background.

As illustrated in FIG. 14, for example, the horizontally inverted image T1 is displayed together with the first background BS1 illustrated in FIG. 11 on the display surface CI of the sensor-equipped display device 200. FIG. 15 is an explanatory diagram explaining an example in which the image is displayed so as to overlap the second background. As illustrated in FIG. 15, the image T1 is displayed together with a second background BS2 illustrated in FIG. 13 on the display surface CI of the sensor-equipped display device 200. As a result, the image T1 is displayed so as to be recognizable on a side where the second detection-target object OBJ2 is detected by the second sensor TP2 (refer to FIG. 1).

As described above, the sensor-equipped display device 200 includes the array substrate 10, the counter substrate 20, the liquid crystal layer LC between the array substrate 10 and the counter substrate 20, the light source 3 disposed so as to emit the light into a side surface of the array substrate 10 or a side surface of the counter substrate 20, the first sensor TP1, and the second sensor TP2. The first sensor TP1 detects the first detection-target object OBJ1 close to the counter substrate 20. The second sensor TP2 detects the second detection-target object OBJ2 close to the array substrate 10. The first background BS1 of the array substrate 10 is viewed from outside the counter substrate 20, and the second background BS2 of the counter substrate 20 is viewed from outside the array substrate 10.

With this configuration, the sensor-equipped display device 200 allows the image T1 displayed using the light source 3 to be viewed from one surface together with the first background BS1 or the second background BS2 on the other surface side opposite to the one surface side, and can detect the first detection-target object OBJ1 close to the one surface and the second detection-target object OBJ2 close to the other surface.

The signal processing circuit 41 processes the image T1 that is displayed together with the first background BS1 in accordance with the detection signal of the first sensor TP1 having detected the first detection-target object OBJ1, assuming the display surface CI (refer to FIG. 12) viewed from outside the counter substrate 20 as a front face. The signal processing circuit 41 processes the image T1 that is displayed together with the second background BS2 in response to the detection signal of the second sensor TP2 having detected the second detection-target object OBJ2, assuming the display surface CI (refer to FIG. 15) viewed from outside the array substrate 10 as the front face. With this processing, the image T1 on the front face is displayed on the side where the viewer is located.

Second Embodiment

Figure 16:
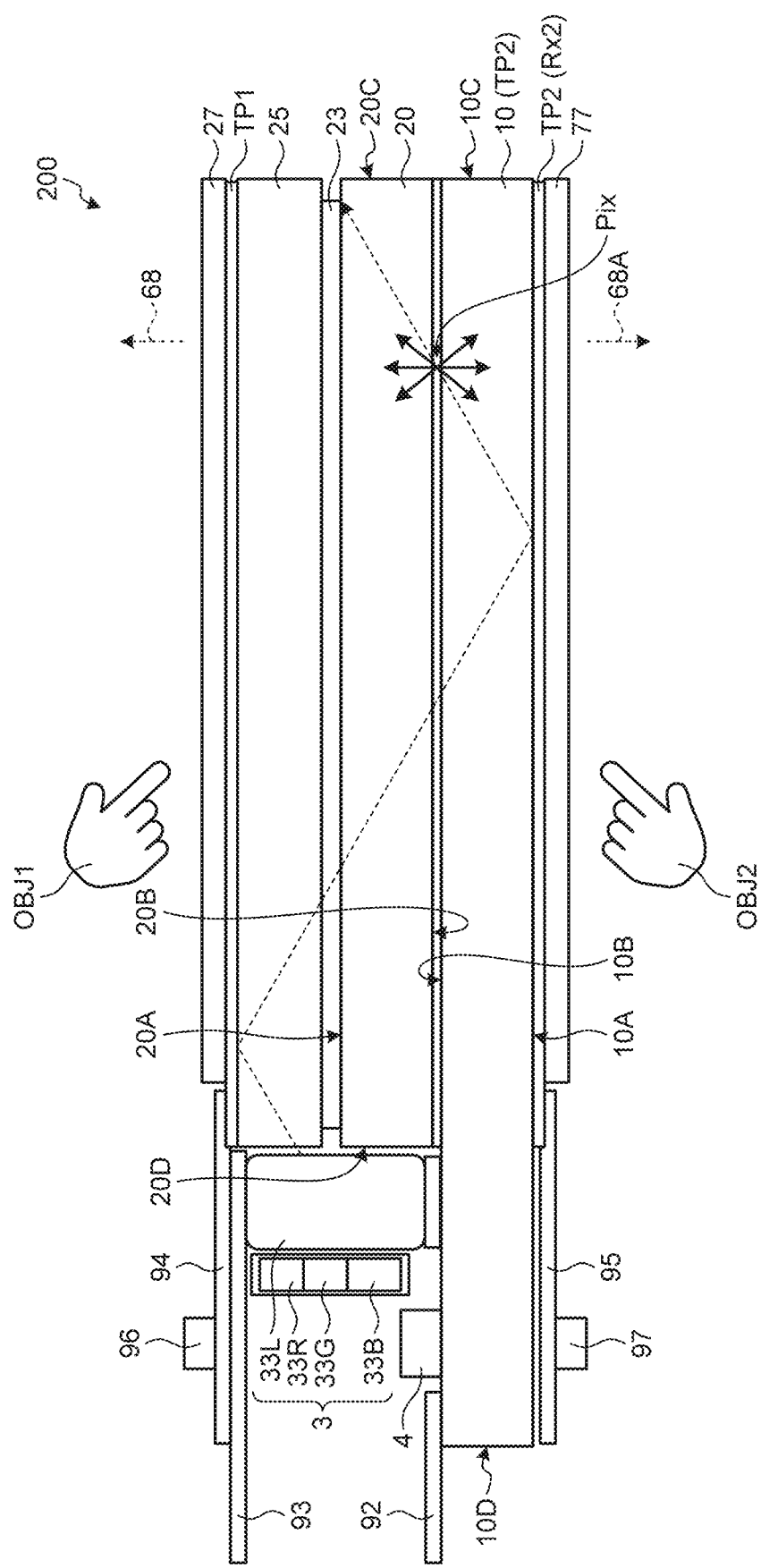
FIG. 16 is a sectional view illustrating an example of a display device according to a second embodiment.

FIG. 16 is a sectional view illustrating an example of the sensor-equipped display device according to a second embodiment. The same components as those described in the above-described embodiment are denoted by the same reference numerals, and the description thereof will not be repeated. The sensor-equipped display device 200 of the second embodiment does not include the base member 75 of the first embodiment. As a result, the light transmitting capability of the sensor-equipped display device 200 of the second embodiment has improved as compared with the first embodiment.

Figure 17:
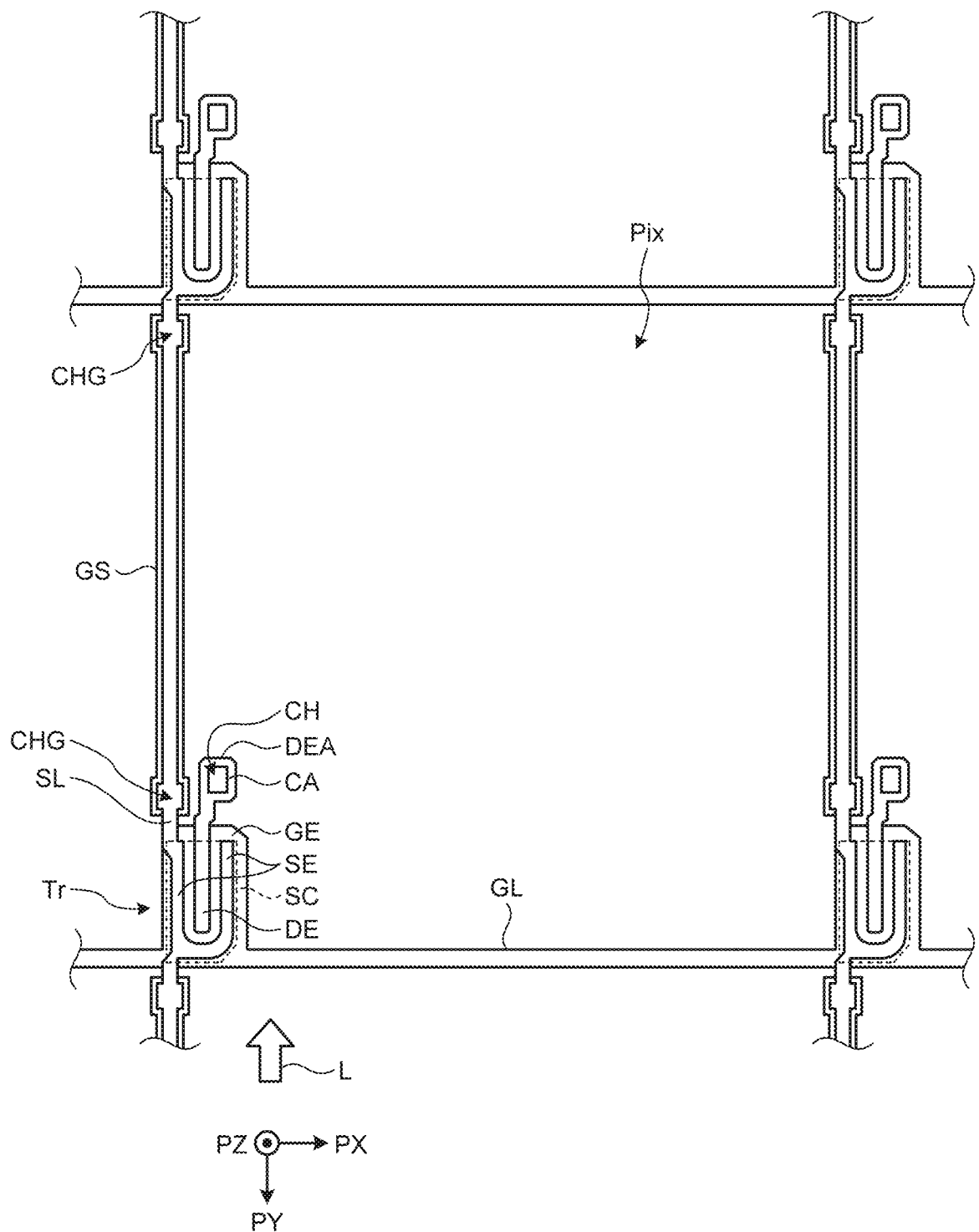
FIG. 17 is a plan view illustrating scanning lines, signal lines, and a switching element in the pixel.
Figure 18:
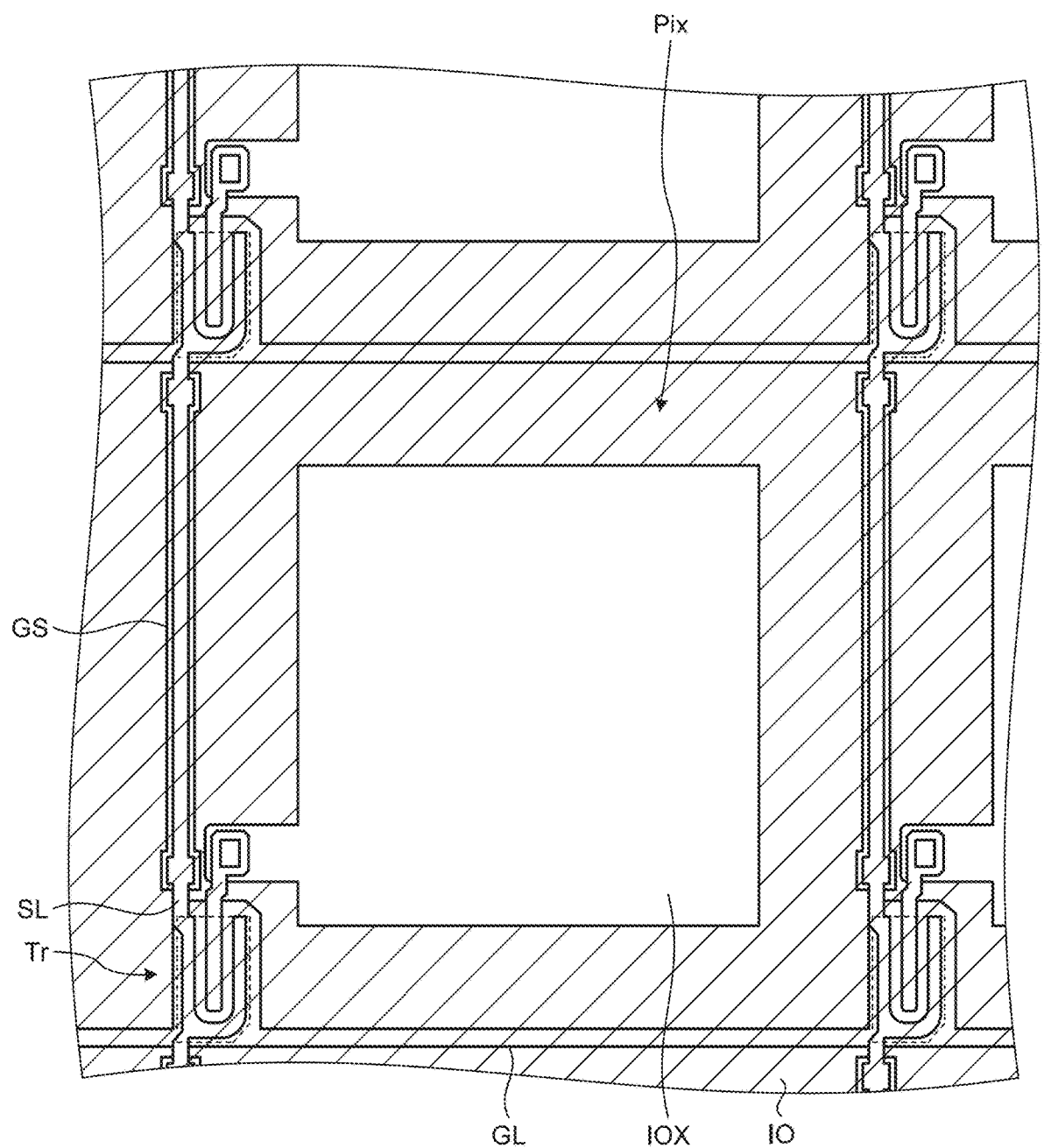
FIG. 18 is a plan view illustrating a holding capacitance layer in the pixel.
Figure 19:
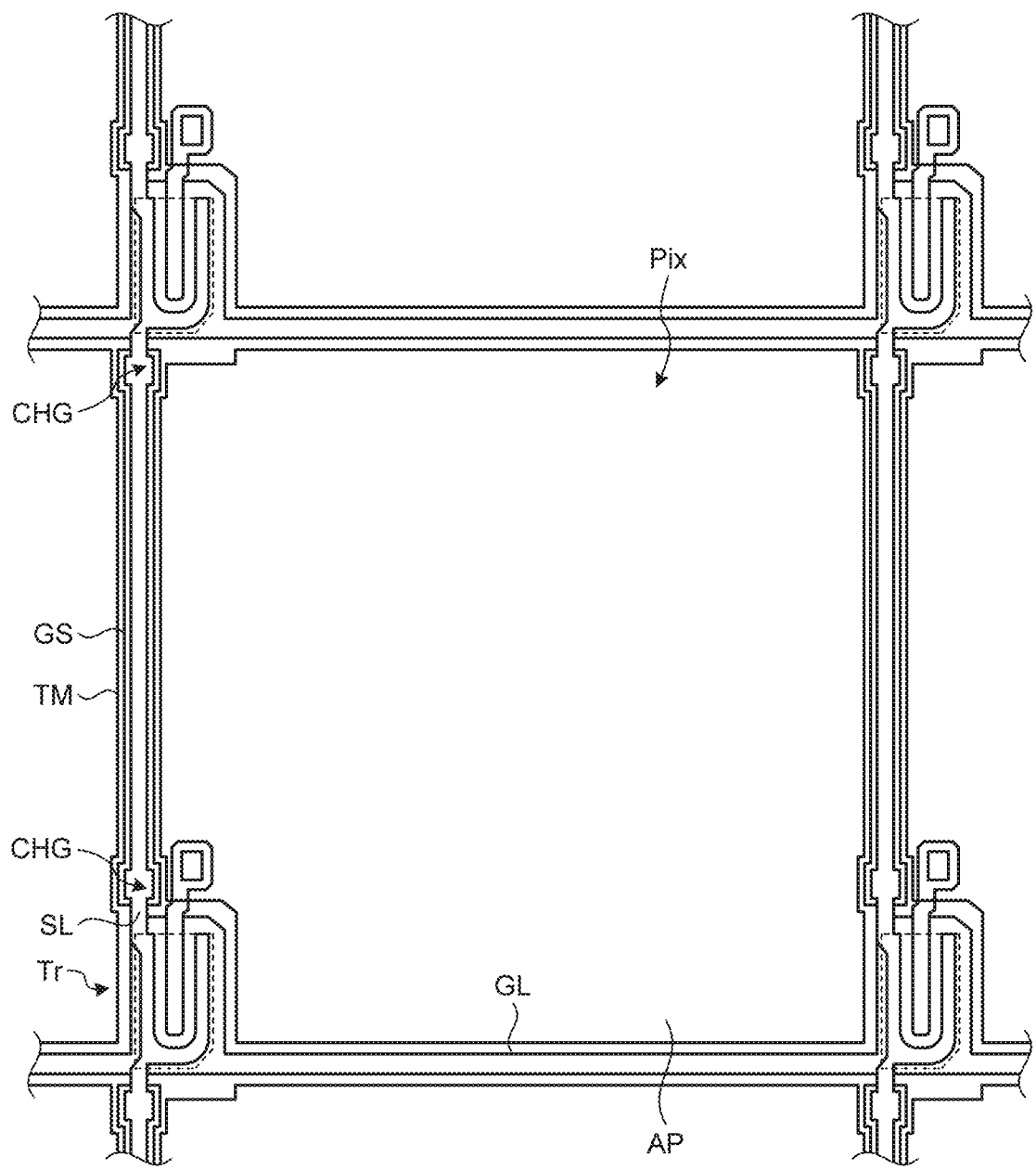
FIG. 19 is a plan view illustrating an auxiliary metal layer and an opening region in the pixel.
Figure 20:
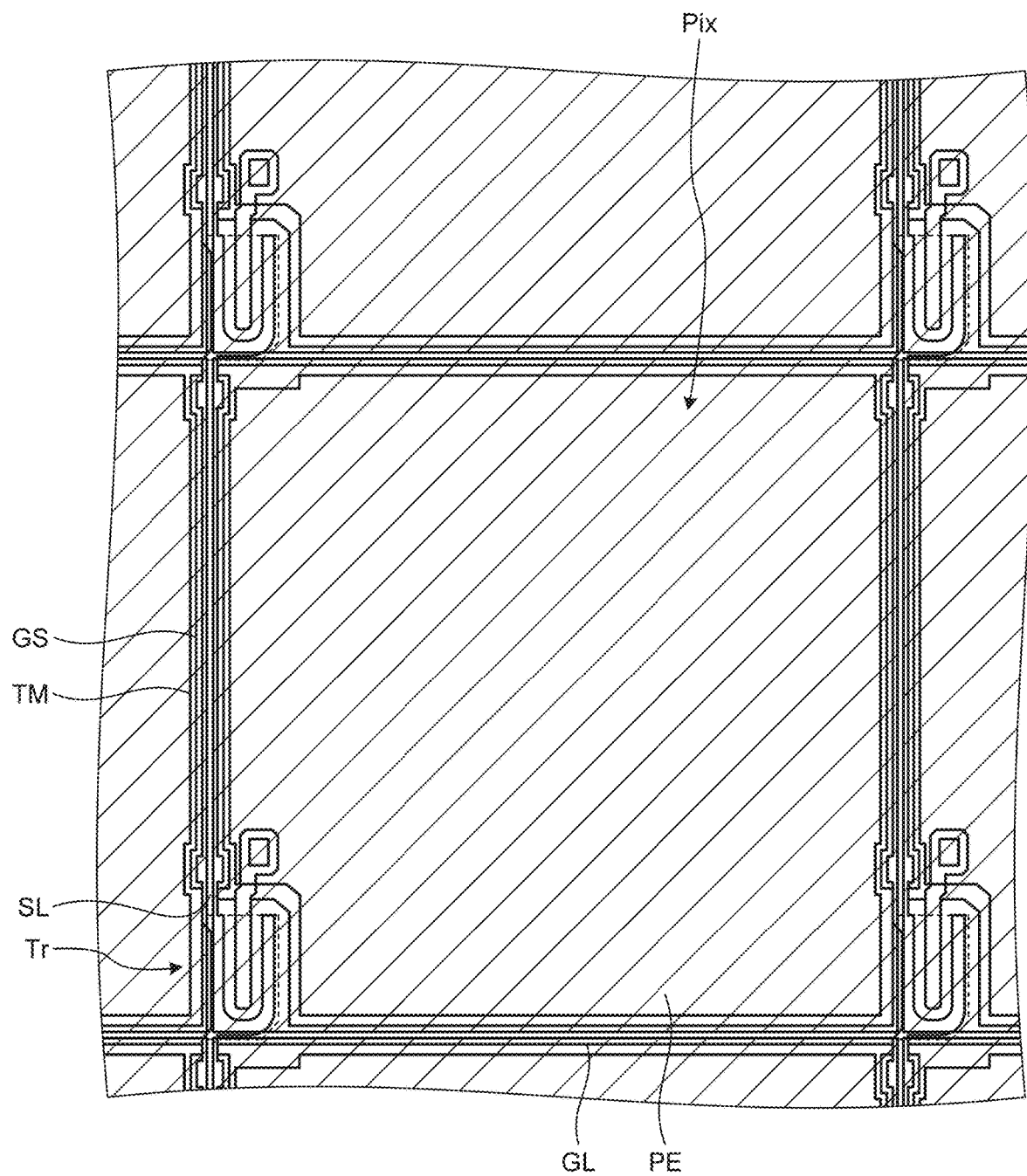
FIG. 20 is a plan view illustrating the pixel electrode in the pixel.
Figure 21:
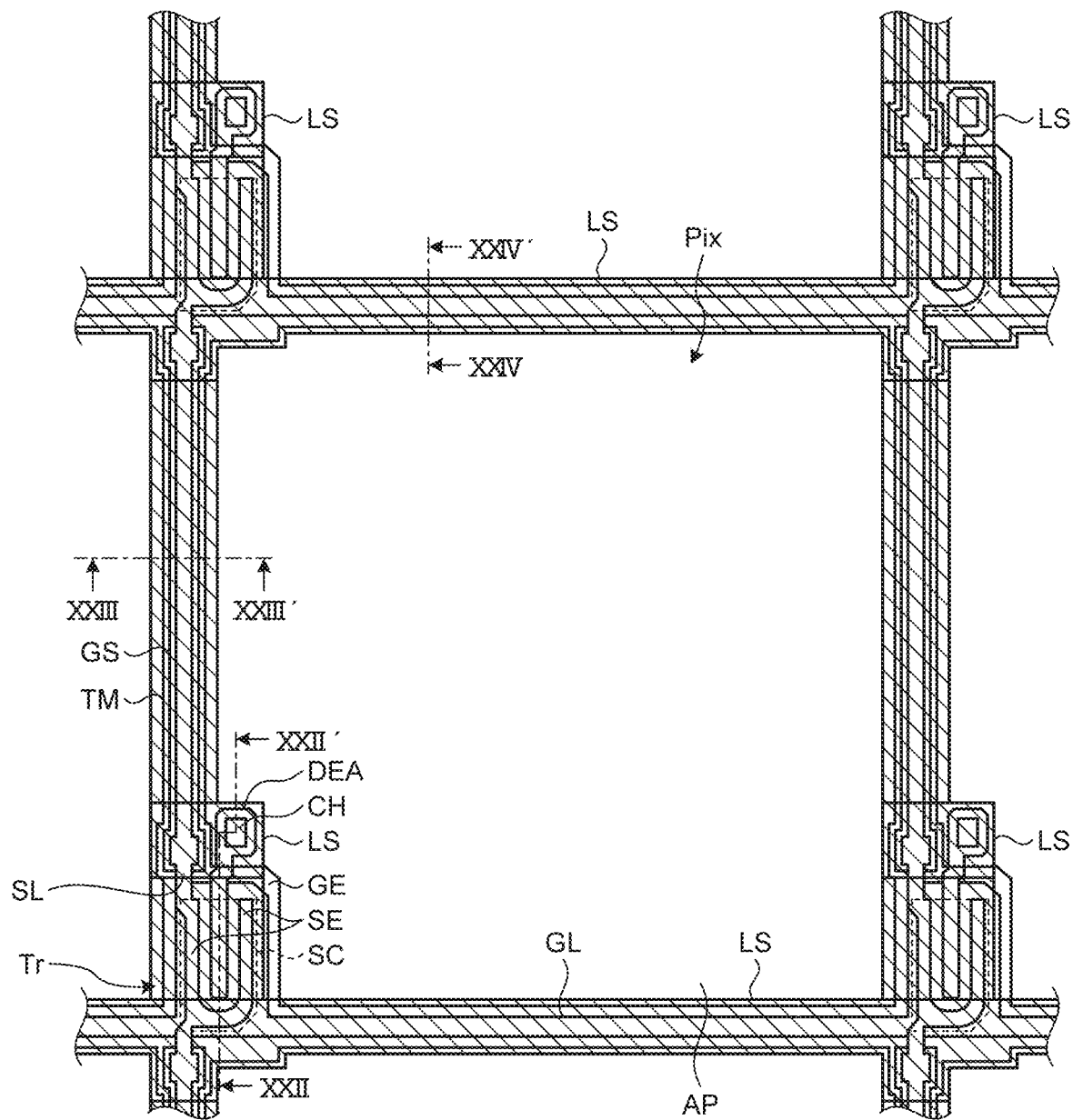
FIG. 21 is a plan view illustrating a light-blocking layer in the pixel.
Figure 22:
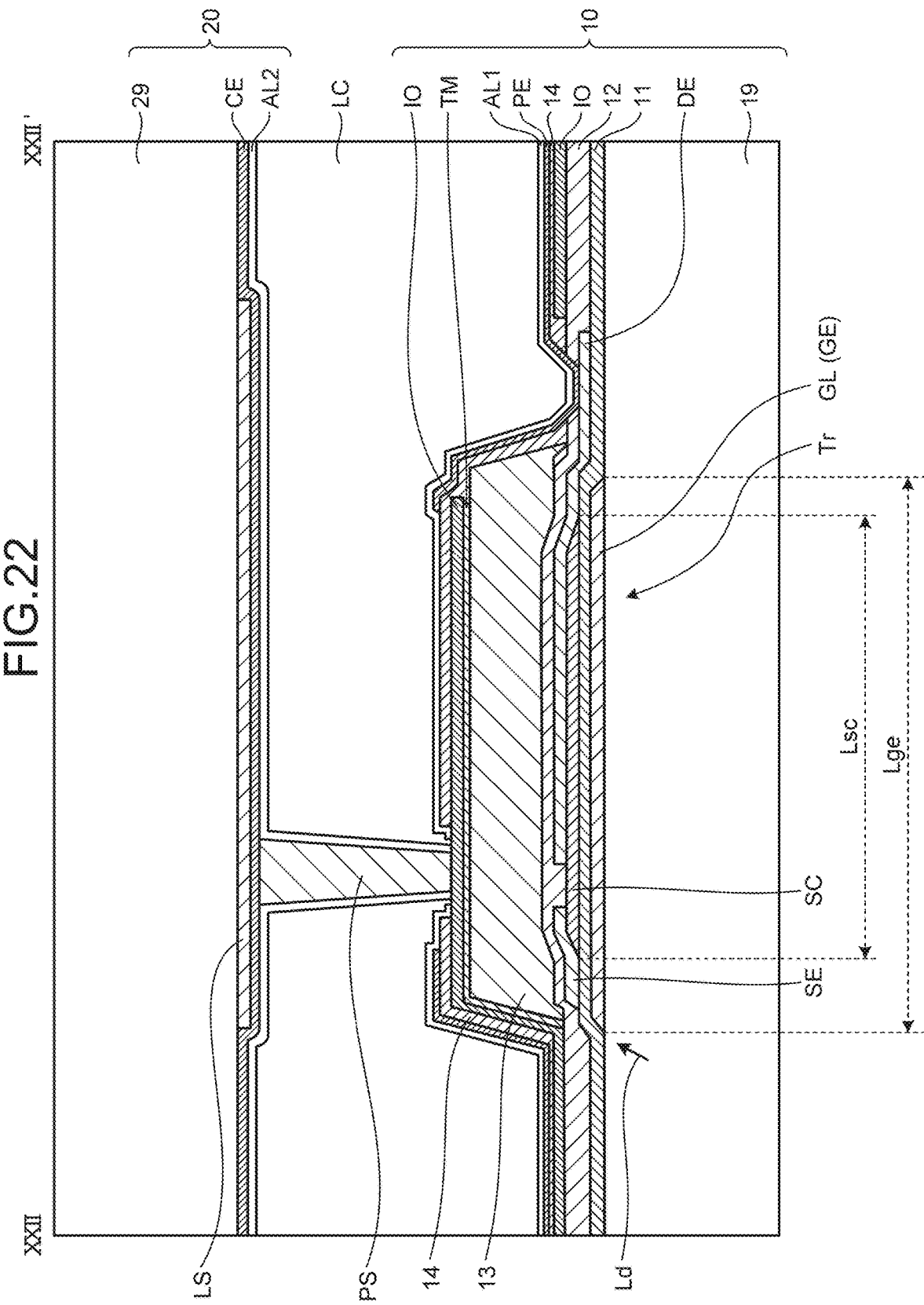
FIG. 22 is a sectional view along XXII-XXII' of FIG. 21.
Figure 23:
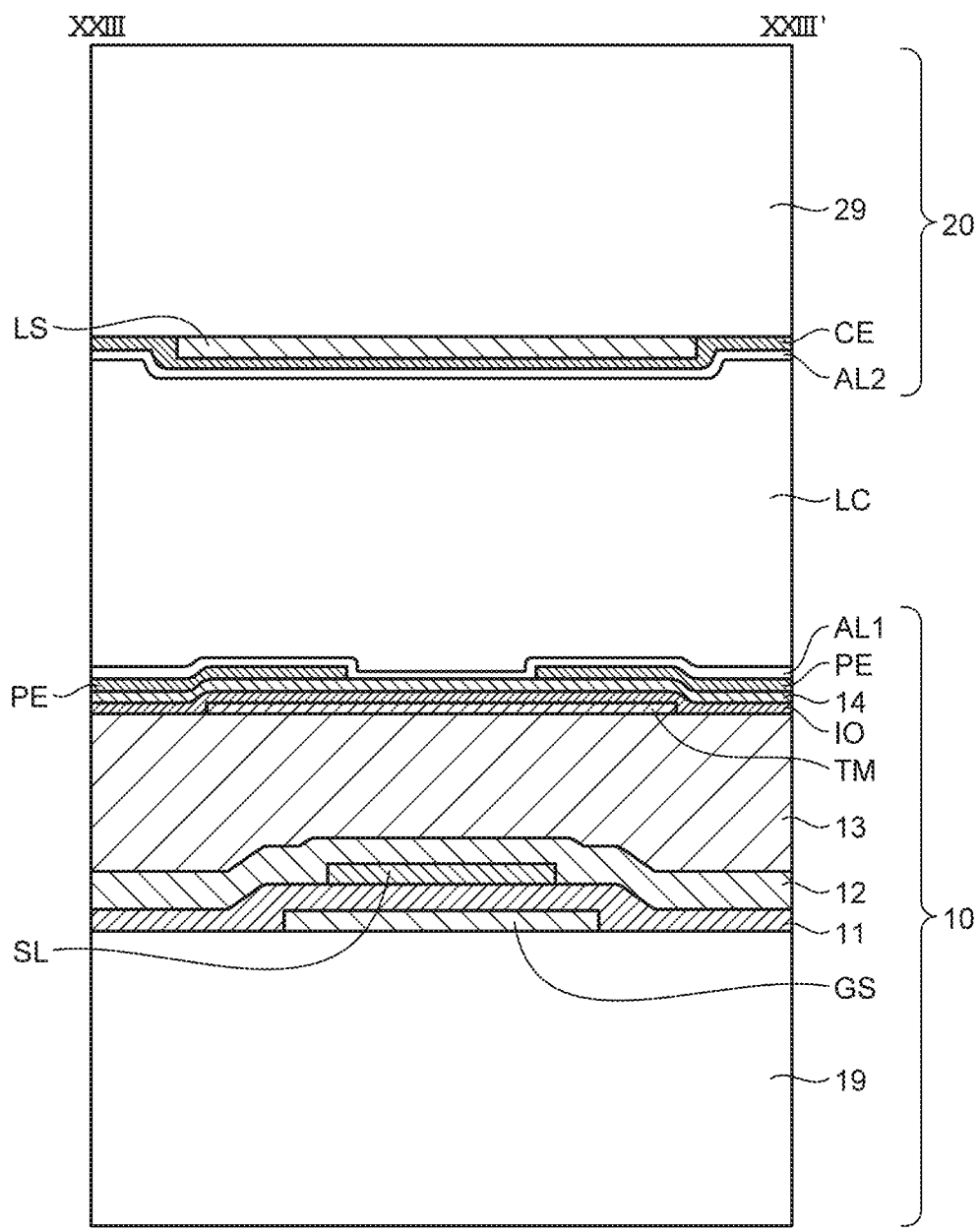
FIG. 23 is a sectional view along XXIII-XXIII' of FIG. 21.
Figure 24:
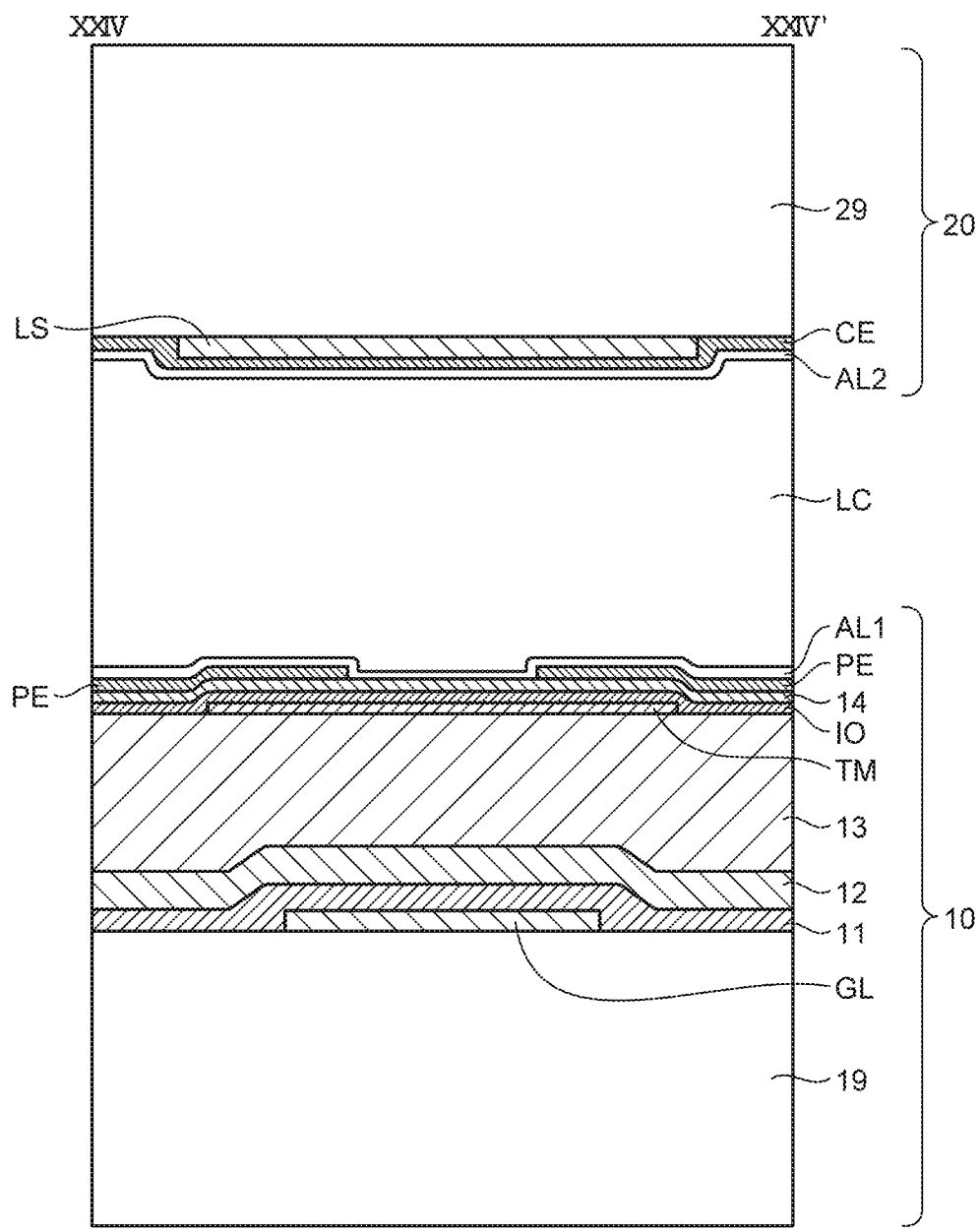
FIG. 24 is a sectional view along XXIV-XXIV' of FIG. 21.

FIG. 17 is a plan view illustrating the scanning lines, the signal lines, and the switching element in the pixel. FIG. 18 is a plan view illustrating a holding capacitance layer in the pixel. FIG. 19 is a plan view illustrating an auxiliary metal layer and an opening region in the pixel. FIG. 20 is a plan view illustrating the pixel electrode in the pixel. FIG. 21 is a plan view illustrating a light-blocking layer in the pixel. FIG. 22 is a sectional view along XXII-XXII' of FIG. 21. FIG. 23 is a sectional view along XXIII-XXIII' of FIG. 21. FIG. 24 is a sectional view along XXIV-XXIV' of FIG. 21. As illustrated in FIGS. 2, 3, and 17, the array substrate 10 is provided with the signal lines SL and the scanning lines GL so as to form a grid in the plan view. In other words, one surface of the array substrate 10 is provided with the signal lines arranged with spaces in the first direction PX and the scanning lines arranged with spaces in the second direction PY.

As illustrated in FIG. 17, a region surrounded by the adjacent scanning lines GL and the adjacent signal lines SL corresponds to the pixel Pix. The pixel Pix is provided with the pixel electrode PE and the switching element Tr. In the present embodiment, the switching element Tr is a bottom-gate thin film transistor. The switching element Tr includes a semiconductor layer SC overlapping, in the plan view, a gate electrode GE electrically coupled to a corresponding one of the scanning lines GL.

As illustrated in FIG. 17, the scanning lines GL are wiring of a metal such as molybdenum (Mo) or aluminum (Al), a multi-layered body of these metals, or an alloy thereof. The signal lines SL are wiring of a metal such as aluminum or an alloy thereof.

As illustrated in FIG. 17, the semiconductor layer SC is provided so as not to protrude from the gate electrode GE in the plan view. As a result, the light-source light L traveling toward the semiconductor layer SC from the gate electrode GE side is reflected, and light leakage is less likely to occur in the semiconductor layer SC.

As illustrated in FIGS. 1 and 20, the light-source light L emitted from the light source 3 is incident in the second direction PY serving as a direction of incidence. When the direction of incidence of the light-source light L is the second direction PY, the width in the first direction of the semiconductor layer SC is less than the width in the second direction of the semiconductor layer SC. This configuration reduces the width in a direction intersecting the direction of incidence of the light-source light L, and thereby, reduces the effect of light leakage.

As illustrated in FIG. 17, source electrodes SE are formed such that two electrical conductors that are the same as the signal line SL extend from the signal line SL in the same layer as that of the signal line SL and in a direction intersecting the signal line. With this configuration, the source electrodes SE electrically coupled to the signal line SL overlap one end of the semiconductor layer SC in the plan view.

As illustrated in FIG. 17, in the plan view, a drain electrode DE is provided in a position between the adjacent electrical conductors of the source electrodes SE. The drain electrode DE overlaps the semiconductor layer SC in the plan view. A portion of the semiconductor layer SC overlapping neither the source electrodes SE nor the drain electrode DE serves as a channel of the switching element Tr. As illustrated in FIG. 20, a contact electrode DEA electrically coupled to the drain electrode DE is electrically coupled to the pixel electrode PE through a contact hole CH.

As illustrated in FIG. 22, the array substrate 10 includes a first light-transmitting base member 19 formed of, for example, glass. The first light-transmitting base member 19 may be any material having a light transmitting capability and may be, for example, a resin such as polyethylene terephthalate.

As illustrated in FIG. 22, the scanning line GL (refer to FIG. 17) and the gate electrode GE are provided on the first light-transmitting base member 19.

In addition, as illustrated in FIG. 22, a first insulating layer 11 is provided so as to cover the scanning line GL and the gate electrode GE. The first insulating layer 11 is formed of, for example, a transparent inorganic insulating material such as silicon nitride.

The semiconductor layer SC is stacked on the first insulating layer 11. The semiconductor layer SC is formed of, for example, amorphous silicon, but may be formed of polysilicon or an oxide semiconductor. When viewed in the same section, a width Lsc of the semiconductor layer SC is less than a width Lge of the gate electrode GE overlapping the semiconductor layer SC. With this configuration, the gate electrode GE can block light Ld that has propagated in the first light-transmitting base member 19. As a result, light leakage of the switching element Tr is reduced.

The source electrode SE and the signal line SL covering portions of the semiconductor layer SC and the drain electrode DE covering a portion of the semiconductor layer SC are provided on the first insulating layer 11. The drain electrode DE is formed of the same material as that of the signal line SL. A second insulating layer 12 is provided on the semiconductor layer SC, the signal line SL, and the drain electrode DE. The second insulating layer 12 is formed of, for example, a transparent inorganic insulating material such as silicon nitride, in the same manner as the first insulating layer.

A third insulating layer 13 covering a portion of the second insulating layer 12 is formed on the second insulating layer 12. A third insulating layer 13 is formed of, for example, a light-transmitting organic insulating material such as an acrylic resin. The third insulating layer 13 has a film thickness greater than other insulating films formed of an inorganic material.

As illustrated in FIGS. 22, 23, and 24, some regions have the third insulating layer 13 while the other regions do not have the third insulating layer 13. As illustrated in FIGS. 23 and 24, the regions having the third insulating layer 13 are located over the scanning lines GL and over the signal lines SL. The third insulating layer 13 has a grid shape that extends along the scanning lines GL and the signal lines SL and overlies (i.e., covers) the scanning lines GL and the signal lines SL. As illustrated in FIG. 22, the regions having the third insulating layer 13 are also located over the semiconductor layer SC, that is, over the switching elements Tr. As a result, the switching element Tr, the scanning line GL, and the signal line SL are located at relatively long distances from the holding capacitance electrode IC, and are thereby less affected by a common potential from the holding capacitance electrode IC. In addition, regions on the array substrate 10 not having the third insulating layer 13 are provided in the regions surrounded by the scanning lines GL and the signal lines SL. Thus, regions are provided in which the thickness of the insulating layer is less than the thickness of the insulating layer overlapping the signal lines SL and the scanning lines GL in the plan view. The regions surrounded by the scanning lines GL and the signal lines SL have relatively higher optical transmittance than the regions over the scanning lines GL and over the signal lines SL, and thus, are improved in light transmitting capability.

As illustrated in FIG. 22, a conductive metal layer TM is provided on the third insulating layer 13. The conductive metal layer TM is wiring of a metal such as molybdenum (Mo) or aluminum (Al), a layered body of these metals, or an alloy thereof. As illustrated in FIG. 19, the metal layer TM is provided in regions overlapping the signal lines SL, the scanning lines GL, and the switching elements Tr in the plan view. With this configuration, the metal layer TM is formed into a grid shape, and openings AP surrounded by the metal layer TM are formed.

As illustrated in FIG. 19, the switching element Tr that is coupled to a corresponding one of the scanning lines GL and a corresponding one of the signal lines SL is provided. At least the switching element Tr is covered with the third insulating layer 13 serving as an organic insulating layer, and the metal layer TM having a larger area than that of the switching element Tr is located on the third insulating layer 13. This configuration can reduce the light leakage of the switching element Tr.

As illustrated in FIG. 22, the holding capacitance electrode IO is provided on the third insulating layer 13 and the metal layer TM. The holding capacitance electrode IO is formed of a light-transmitting conductive material such as indium tin oxide (ITO). The holding capacitance electrode IO is also called "third light-transmitting electrode". As illustrated in FIG. 18, the holding capacitance electrode IO has a region IOX including no light-transmitting conductive material in each of the regions surrounded by the scanning lines GL and the signal lines SL. The holding capacitance electrode IO extends across the adjacent pixels Pix and is provided over the pixels Pix. A region of the holding capacitance electrode IO including the light-transmitting conductive material overlaps the scanning line GL or the signal line SL, and extends to the adjacent pixel Pix.

The holding capacitance electrode IO has a grid shape that extends along the scanning lines GL and the signal lines SL and overlies (i.e., covers) the scanning lines GL and the signal lines SL. With this configuration, the holding capacitance HC between the region IOX including no light-transmitting conductive material and the pixel electrode PE is reduced. Therefore, the holding capacitance HC is adjusted by the size of the region IOX including no light-transmitting conductive material.

The metal layer TM may be located on the upper side of the holding capacitance electrode IO and only needs to be stacked with the holding capacitance electrode IO. The metal layer TM has a lower electrical resistance than that of the holding capacitance electrode IO. Therefore, the potential of the holding capacitance electrode IO is restrained from varying with the position where the pixel Pix is located, of the display region AA.

As illustrated in FIG. 19, a width of the metal layer TM overlapping the signal line SL is greater than a width of the signal line SL in the plan view. This configuration restrains reflected light reflected by edges of the signal line SL from being emitted from the display panel 2. The width of the metal layer TM and the width of the signal line SL are lengths in a direction intersecting the extending direction of the signal line SL. The width of the metal layer TM overlapping the scanning line GL is greater than the width of the scanning line GL. The width of the metal layer TM and the width of the scanning line GL are lengths in a direction intersecting the extending direction of the scanning line GL.

As illustrated in FIG. 22, a fourth insulating layer 14 is provided on the holding capacitance electrode IO and the metal layer TM. The fourth insulating layer 14 is an inorganic insulating layer formed of, for example, a transparent inorganic insulating material such as silicon nitride.

As illustrated in FIG. 22, the pixel electrode PE is provided on the fourth insulating layer 14. The pixel electrode PE is formed of a light-transmitting conductive material such as ITO. The pixel electrode PE is electrically coupled to the contact electrode DEA through the contact hole CH provided in the fourth insulating layer 14, the third insulating layer 13, and the second insulating layer 12. As illustrated in FIG. 20, each of the pixel electrodes PE is partitioned off on a pixel Pix basis. The first orientation film AL1 is provided on the upper side of the pixel electrode PE.

As illustrated in FIG. 22, the counter substrate 20 includes a second light-transmitting base member 29 formed of, for example, glass. The material of the second light-transmitting base member 29 may be any material having a light transmitting capability and may be, for example, a resin such as polyethylene terephthalate. The second light-transmitting base member 29 is provided with the common electrode CE. The common electrode CE is formed of a light-transmitting conductive material such as ITO. The second orientation film AL2 is provided on a surface of the common electrode CE. The counter substrate 20 includes a light-blocking layer LS between the second light-transmitting base member 29 and the common electrode CE. The light-blocking layer LS is formed of a black resin or a metal material. When the light-blocking layer LS is of a metal material, the light-blocking layer LS contributes to lowering the resistance of the common electrode CE by being stacked on the common electrode CE. A spacer PS is provided between the array substrate 10 and the counter substrate 20. The spacer PS is formed of a conductive material. Alternatively, when the spacer PS is formed of an insulating material, a conductive material is applied to the surface of the spacer PS. In the second embodiment, the spacer PS is formed on the common electrode CE and is of a conductive material to couple the common electrode CE to the holding capacitance electrode IO. The first orientation film AL1 and the second orientation film AL2 are not provided on a contact surface of the spacer PS that is in contact with the common electrode CE nor on a contact surface of the spacer PS that is in contact with the holding capacitance electrode IC. The structure is not limited to this example and may be such that the spacer PS is formed on the light-blocking layer LS, the common electrode CE is formed so as to cover the spacer PS, and the common electrode CE on top of the spacer PS directly contacts the holding capacitance electrode IC.

As illustrated in FIGS. 19 and 23, in the display device, a light-blocking layer GS located in the same layer as that of the scanning line GL is provided in a position extending along the signal line SL and overlapping a portion of the signal line SL. The light-blocking layer GS is formed of the same material as that of the scanning line GL. The light-blocking layer GS is not provided at a portion where the scanning line GL intersects the signal line SL in the plan view.

As illustrated in FIG. 19, the light-blocking layer GS is electrically coupled to the signal line SL through a contact hole CHG. With this configuration, the wiring resistance of a combination of the light-blocking layer GS and the signal line SL is lower than that of only the signal line SL. As a result, the delay of the gradation signal supplied to the signal line SL is restrained. The contact hole CHG need not be provided, and the light-blocking layer GS need not be coupled to the signal line SL. Since the light-blocking layer GS overlaps the signal line SL in parallel thereto, the light-source light L emitted from the first light-transmitting base member 19 of the array substrate 10 is restrained from leaking in the first direction PX, and thus, the contrast in each of the pixels Pix can also be improved.

As illustrated in FIG. 23, the light-blocking layer GS is provided on the side opposite to the metal layer TM with respect to the signal line SL. The width of the light-blocking layer GS is greater than that of the signal line SL and less than that of the metal layer TM. The width of the light-blocking layer GS, the width of the metal layer TM, and the width of the signal line SL are lengths in a direction intersecting the extending direction of the signal line SL. In this manner, the light-blocking layer GS has a width greater than that of the signal line SL, and thus, restrains the reflected light reflected by the edges of the signal line SL from being emitted from the display panel 2. As a result, visibility of images is improved in the display device 1.

As illustrated in FIGS. 21 and 22, the counter substrate 20 is provided with the light-blocking layer LS. The light-blocking layer LS is provided in a region overlapping the signal line SL, the scanning line GL, and the switching element Tr in the plan view.

As illustrated in FIGS. 21, 22, 23, and 24, the light-blocking layer LS has a width greater than that of the metal layer TM. This configuration restrains reflected light reflected by edges of the signal line SL, the scanning line GL, and the metal layer TM from being emitted from the display panel 2. As a result, the visibility of images is improved in the display device 1.

The contact hole CH and the contact hole CHG are likely to diffusely reflect the light-source light L emitted thereto. Therefore, the light-blocking layer LS is provided in regions overlapping the contact hole CH and the contact hole CHG, respectively, in the plan view.

As illustrated on FIG. 22, the spacer PS is disposed between the array substrate 10 and the counter substrate 20, and improves the uniformity of the distance between the array substrate 10 and the counter substrate 20.

Figure 25:
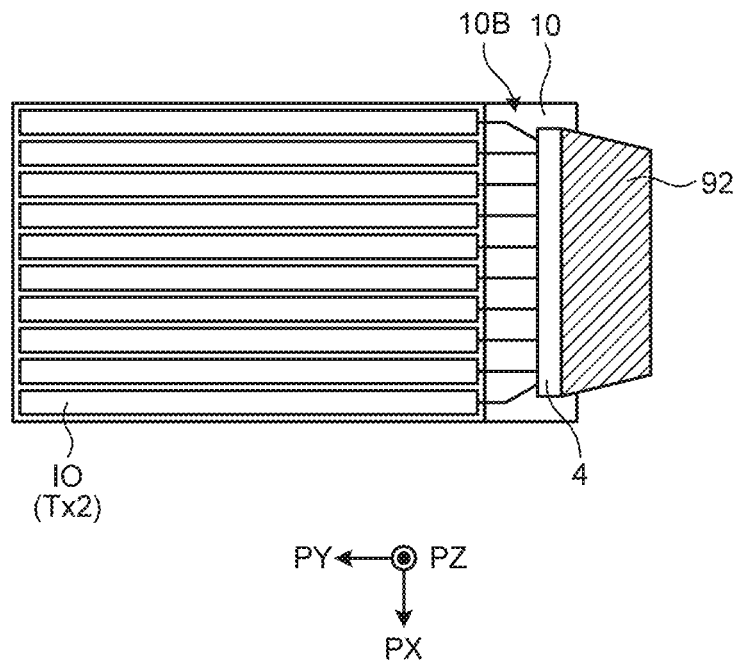
FIG. 25 is a plan view of drive electrodes formed in the holding capacitance layer of the second embodiment.
Figure 26:
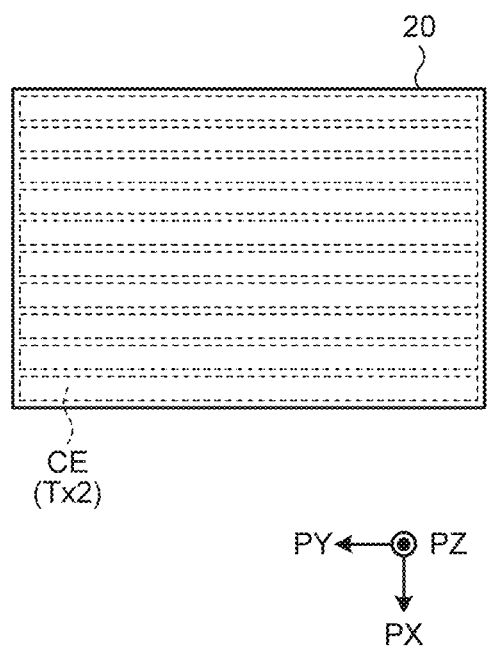
FIG. 26 is a plan view of the drive electrodes formed of counter electrodes of the second embodiment.

FIG. 25 is a plan view of drive electrodes formed in the holding capacitance layer of the second embodiment. FIG. 26 is a plan view of the drive electrodes formed of counter electrodes of the second embodiment. As described above, the holding capacitance electrode IC extends across the adjacent pixels Pix and is provided over the pixels Pix. As illustrated in FIG. 25, when the array substrate 10 is viewed from above, the holding capacitance electrodes IO have a longitudinal direction in the second direction PY and are arranged in the first direction PX. In this manner, the array substrate 10 includes the pixel electrodes PE each disposed for a corresponding one of the pixels Pix and the holding capacitance electrodes IO each at least partially overlapping the pixel electrode PE in the pixel Pix in the plan view with the inorganic insulating layer interposed therebetween. The holding capacitance electrodes IO are divided by slits and serve as the second electrodes Tx2 of the second sensor TP2.

As illustrated in FIG. 26, when the counter substrate 20 is viewed from above, the common electrodes CE have a longitudinal direction in the second direction PY and are arranged in the first direction PX. One common electrode CE of FIG. 26 occupies an area having substantially the same outer shape as that of one holding capacitance electrode IO of FIG. 25 overlapping the one common electrode CE in the plan view. One common electrode CE of FIG. 26 is electrically coupled to one holding capacitance electrode IO of FIG. 25 overlapping the one common electrode CE in the plan view at the position of the spacer PS of FIG. 22. With this configuration, when, using one holding capacitance electrode IO as the second electrode TX2, the alternating-current rectangular wave Sg2 having the predetermined frequency is applied to the one holding capacitance electrode IC to drive the one holding capacitance electrode IC, the same alternating-current rectangular wave Sg2 is applied to one common electrode CE overlapping the one holding capacitance electrode IC in the plan view. Consequently, the common electrode CE of FIG. 26 also serves as the second electrode Tx2 of the second sensor TP2. As a result, the alternating-current rectangular wave Sg2 is difficult to affect the scattering state of the polymer-dispersed liquid crystals filled between the array substrate 10 and the counter substrate 20.

Figure 27:
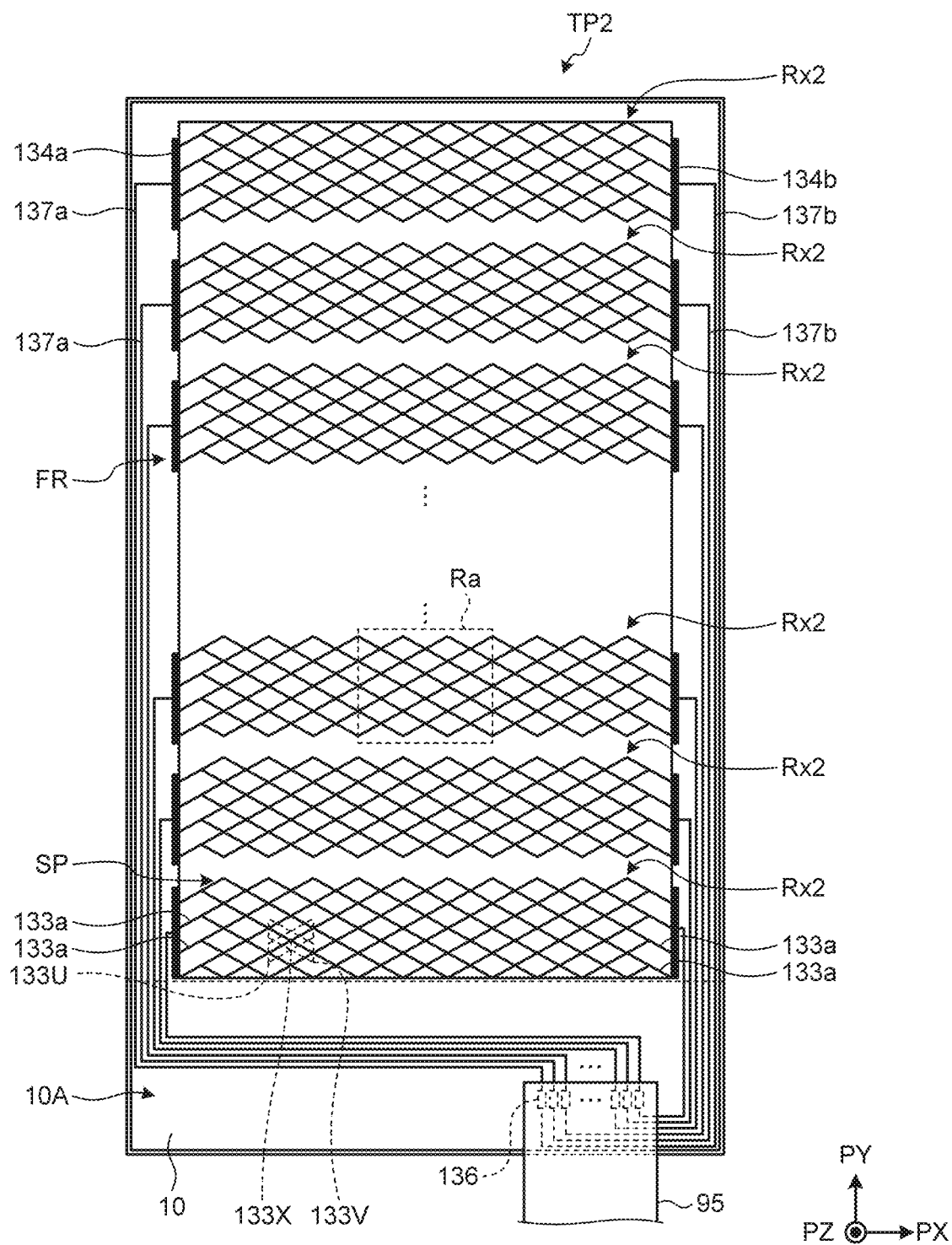
FIG. 27 is a plan view of detection electrodes.
Figure 28:
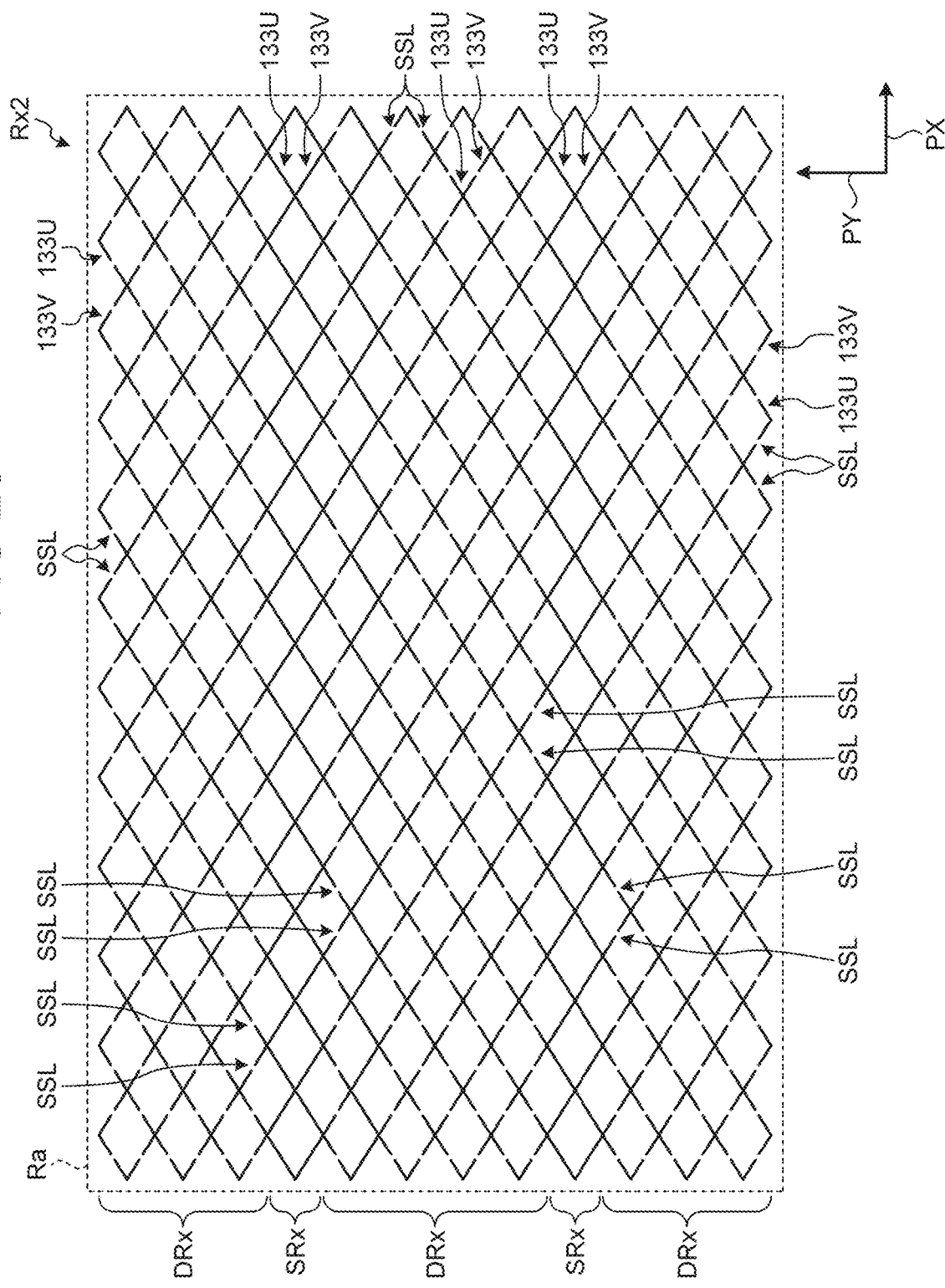
FIG. 28 is a partial enlarged plan view of the detection electrodes of FIG. 27.

FIG. 27 is a plan view of detection electrodes. FIG. 28 is a partial enlarged plan view of the detection electrodes of FIG. 27. As illustrated in FIGS. 27 and 16, the first electrodes Rx2 are provided on the first principal surface 10A of the array substrate 10 (first light-transmitting base member 19). Each of the first electrodes Rx2 extends in a direction (first direction PX) intersecting the extending direction of the holding capacitance electrodes IC (Tx2) serving as the drive electrodes illustrated in FIG. 25 and the common electrodes CE (Tx2). As illustrated in FIG. 27, the first electrodes Rx2 are arranged with spaces SP in the second direction PY. That is, the holding capacitance electrodes IC (Tx2) and the common electrodes CE (Tx2) are arranged so as to intersect the first electrodes Rx2 in the plan view, and capacitance is generated at portions where the electrodes overlap each other.

As illustrated in FIGS. 27 and 28, the first electrode Rx2 of the second embodiment includes a plurality of first thin wiring lines 133U and a plurality of second thin wiring lines 133V. The first thin wiring line 133U and the second thin wiring line 133V are slanted in directions opposite to each other with respect to a direction parallel to one side of a display region 10a. The first thin wiring line 133U forms a first angle with the first direction PX, and the second thin wiring line 133V forms a second angle with the first direction PX.

The first thin wiring lines 133U and the second thin wiring lines 133V are narrow conductive metal wiring lines. The first thin wiring lines 133U are arranged in the second direction PY with a space provided between one another in the display region 10a. The second thin wiring lines 133V are also arranged in the second direction PY with a space provided between one another.

The first electrode Rx2 includes at least one of the first thin wiring lines 133U and at least one of the second thin wiring lines 133V that intersects the first thin wiring line 133U. The first thin wiring lines 133U are electrically coupled to the second thin wiring lines 133V at coupling portions 133X. When the first thin wiring lines 133U and the second thin wiring lines 133V have multiple intersections with each other, one mesh of the first electrode Rx2 forms a shape of a parallelogram.

Both ends in the extending direction of the first thin wiring lines 133U and the second thin wiring lines 133V are coupled to coupling wiring 134a and 134b disposed in the peripheral region FR. The first thin wiring lines 133U and the second thin wiring lines 133V serving as a main detector of the first electrodes Rx2 are coupled to the coupling wiring 134a and 134b through thin wiring lines 133a. With this configuration, the first thin wiring lines 133U and the second thin wiring lines 133V are electrically coupled to each other and serve as one first electrode Rx2.

The first thin wiring lines 133U and the second thin wiring lines 133V are formed of layers of one or more types of metals selected from aluminum (Al), copper (Cu), silver (Ag), molybdenum (Mo), chromium (Cr), titanium (Ti), and tungsten (W). Alternatively, the first thin wiring lines 133U and the second thin wiring lines 133V are formed of an alloy containing one or more types of metals selected from these metal materials. The first thin wiring lines 133U and the second thin wiring lines 133V may also be a multi-layered body obtained by stacking a plurality of conductive layers of an alloy containing these metal materials or one or more types of these materials. The first thin wiring lines 133U and the second thin wiring lines 133V may be obtained by stacking conductive layers of a light-transmitting conductive oxide such as ITO, or may be obtained by stacking blackened films, black organic films, or black conductive organic films obtained by combining the metal materials and the conductive layers mentioned above.

The above-mentioned metal materials have a lower resistance than that of the light-transmitting conductive oxide such as ITO. Since the above-mentioned metal materials have a higher light blocking effect than that of the light-transmitting conductive oxide, the transmittance may be reduced or the pattern of the first electrodes Rx2 may be visible. In the second embodiment, each of the first electrodes Rx2 includes the first thin wiring lines 133U and the second thin wiring lines 133V having a small wiring line width, and the first thin wiring lines 133U and the second thin wiring lines 133V are arranged with a space greater than the wiring line width between one another. As a result, the low resistance and the invisibility can be achieved.

The width of each of the first thin wiring lines 133U and the second thin wiring lines 133V is preferably in a range from 1 μm to 10 μm and is more preferably in a range from 1 μm to 5 μm. This is because, when the width of each of the first thin wiring lines 133U and the second thin wiring lines 133V is equal to or less than 10 μm, the area of blocking the light is reduced, and the opening ratio is less likely to be reduced. The opening refers to a region overlapping none of the light-blocking layer LS, the scanning lines GL, and the signal lines SL. This is also because, when the width of each of the first thin wiring lines 133U and the second thin wiring lines 133V is equal to or greater than 1 μm, the shape thereof is stabilized, and the wiring lines are less likely to be disconnected.

The first thin wiring lines 133U and the second thin wiring lines 133V of the first electrode Rx2 may be arranged with fluctuation within a preferable range. That is, the first electrode Rx2 may have different spaces between the first thin wiring lines 133U and between the second thin wiring lines 133V.

As illustrated in FIG. 28, the first electrode Rx2 includes sensor portions SRx and dummy portions DRx. The sensor portions SRx and the dummy portions DRx extend in the first direction PX and are alternately arranged in the second direction PY. The sensor portions SRx are coupled to the coupling wiring 134a and 134b illustrated in FIG. 27 and mainly serve as the detection electrodes. The dummy portions DRx are provided so as to be electrically separated from the sensor portions SRx and the coupling wiring 134a and 134b. The dummy portions DRx are dummy electrodes that do not serve as the detection electrodes.

The sensor portions SRx and the dummy portions DRx each include the first thin wiring lines 133U and the second thin wiring lines 133V described above, and have mesh-like configurations similar to each other. This configuration can reduce the variation in light transmittance, thereby obtaining good visibility. The sensor portions SRx are electrically separated from the dummy portions DRx by slits SSL provided in the first thin wiring lines 133U and the second thin wiring lines 133V. The slits SSL are provided in the first thin wiring lines 133U and the second thin wiring lines 133V forming each mesh of each of the dummy portions DRx. With such a configuration, in the detection operation of the second sensor TP2, the dummy portions DRx are brought into a floating state in which the dummy portions DRx are not supplied with a voltage signal and are not fixed in potential.

As illustrated in FIG. 27, a first wiring line 137a and a second wiring line 137b coupled to one of the first electrodes Rx2 are coupled to one terminal portion 136. That is, the first electrode Rx2, the first wiring line 137a, the second wiring line 137b, and the terminal portion 136 are coupled in a loop shape. The first electrode Rx2 is coupled to the flexible substrate 95 through the first wiring line 137a, the second wiring line 137b, and the terminal portion 136.

The same material as, for example, one of the metal materials or the alloy thereof used for the first thin wiring lines 133U and the second thin wiring lines 133V can be used for the first wiring line 137a and the second wiring line 137b. The first wiring line 137a and the second wiring line 137b only need to be made of a material having good conductivity and may be made using a material different from that of the first thin wiring lines 133U and the second thin wiring lines 133V.

As described above, the first wiring line 137a and the second wiring line 137b are coupled to one first electrode Rx2. Therefore, even if one of the first wiring line 137a and the second wiring line 137b is disconnected, the other wiring line ensures the coupling between the first electrode Rx2 and the flexible substrate 95. Thus, the coupling reliability between the first electrode Rx2 and the flexible substrate 95 is improved.

The protective layer 77 illustrated in FIG. 16 covers the first electrodes Rx2. Therefore, an effective sheet resistance value of the protective layer 77 is in a range from $10^9$ ohm/square to $10^{12}$ ohm/square. As a result, the deterioration of the display quality due to electrostatic charge of the first electrode Rx2 can be restrained. To limit the effective sheet resistance value of the protective layer 77 within the above-mentioned range, the compounding ratio of one or more base materials among an indium oxide ($In_2O_3$), zinc oxide (ZnO), and tin oxide ($SnO_2$) to silicon dioxide ($SiO_2$) serving as a high-resistance component needs to be adjusted. The effective sheet resistance value can be measured using a known two-terminal method.

Figure 29:
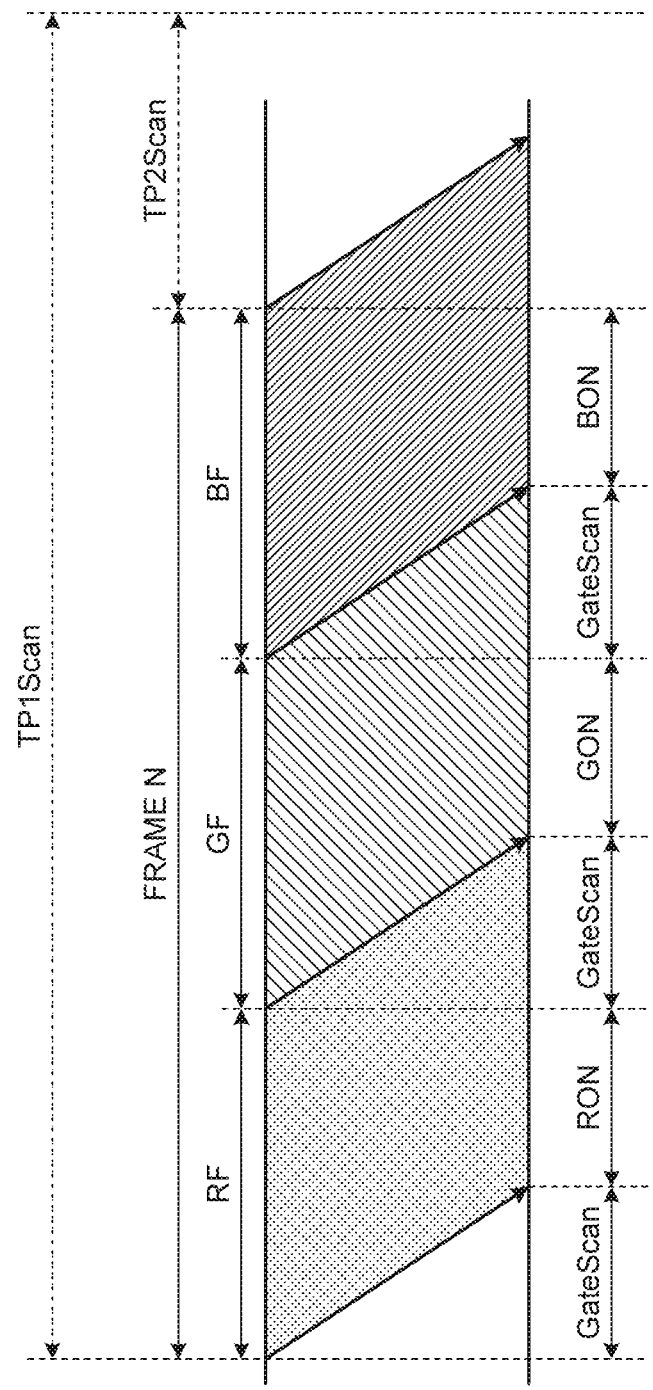
FIG. 29 is a timing diagram explaining a timing of light emission by a light source in a field-sequential system of the second embodiment.

FIG. 29 is a timing diagram explaining the timing of the light emission by the light source in the field-sequential system of the second embodiment. A potential of each of the pixel electrodes PE (refer to FIG. 20) written in each of the one vertical scanning periods GateScan illustrated in FIG. 29 needs to be held during at least one of the first color light emission period RON, the second color light emission period GON, and the third color light emission period BON coming after the one vertical scanning period GateScan. If the written potential of each of the pixel electrodes PE cannot be held during at least one of the first color light emission period RON, the second color light emission period GON, and the third color light emission period BON coming after each of the one vertical scanning period GateScan, for example, what are called flickers and the like are likely to occur. In other words, in order to shorten the one vertical scanning period GateScan serving as a time for selecting the scanning lines and increase the visibility in the driving using what is called the field-sequential system, the written potential of each of the pixel electrodes PE is required to be easily held during each of the first color light emission period RON, the second color light emission period GON, and the third color light emission period BON.

The array substrate includes the holding capacitance electrode IO serving as the third light-transmitting electrode at least partially overlapping the pixel electrode PE in the plan view with the insulating layer interposed therebetween in each of the pixels Pix. A constant voltage is applied from the common potential wiring COML to the common electrode CE and the holding capacitance electrode IO such that the common electrode CE and the holding capacitance electrode IO are set at the common potential. Consequently, the holding capacitance HC is generated between the pixel electrode PE and the holding capacitance electrode IO. As a result, the written potential of each of the pixel electrodes PE can be easily held during the first color light emission period RON, the second color light emission period GON, and the third color light emission period BON coming after each of the one vertical scanning period GateScan. In addition, the time for selecting the scanning lines can also be reduced while reducing the deterioration of the display quality such as the flickers. The visibility of the image displayed on the display panel 2 can be improved.

The holding capacitance electrode IO also serves as the second electrode Tx2 of the second sensor TP2. Consequently, when the alternating-current rectangular wave Sg2 is applied to the second electrode Tx2 of the second sensor TP2, the display quality may be affected. Therefore, as illustrated in FIG. 29, the second sensor TP2 performs the detection operation in the second detection period TP2Scan that is separated from the one frame N in a time-division manner.

That is, the first detection period TP1Scan in which the first sensor TP1 performs the detection operation is processed at the same time as a display period. In contrast, the second detection period TP2Scan in which the second sensor TP2 performs the detection operation is processed separately from the display period in a time-division manner. As a result, the frequency of the report signals of the first sensor detection circuit 96 illustrated in FIG. 16 can be higher than the frequency of the report signals of the second sensor detection circuit 97.

Figure 30:
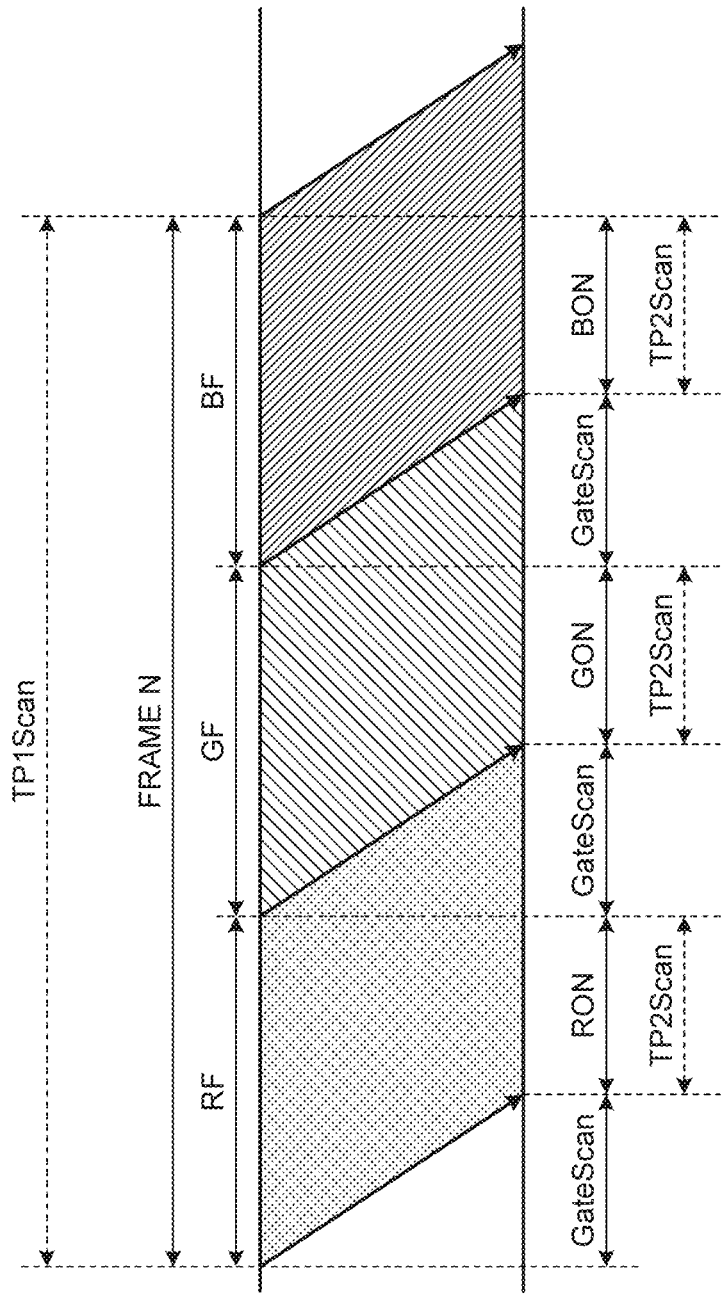
FIG. 30 is another timing diagram explaining the timing of the light emission by the light source in the field-sequential system of the second embodiment.

FIG. 30 is another timing diagram explaining the timing of the light emission by the light source in the field-sequential system of the second embodiment. As illustrated in FIG. 30, even if the second sensor TP2 performs the detection operation between the one vertical scanning period GateScan and the one vertical scanning period GateScan, it is difficult to affect the writing of the potential of each of the pixel electrodes PE. Therefore, the second sensor TP2 may perform the detection operation in the second detection period TP2Scan at the same time as at least one of the first color light emission period RON, the second color light emission period GON, and the third color light emission period BON. In other words, as illustrated in FIG. 30, even in the one frame N, the second sensor TP2 can perform the detection operation in the second detection period TP2Scan that is separated from the one vertical scanning period GateScan in a time-division manner. As a result, the sensor-equipped display device 200 can more reduce the deterioration of the display quality such as color breakup of the display by operating according to the timing diagram of FIG. 30 instead of performing the detection operation according to the timing diagram of FIG. 29.

The first detection period TP1Scan in which the first sensor TP1 performs the detection operation is processed at the same time as the display period. In contrast, the second detection period TP2Scan in which the second sensor TP2 performs the detection operation is processed separately from the vertical scanning period GateScan in a time-division manner. As a result, the frequency of the report signals of the first sensor detection circuit 96 illustrated in FIG. 16 can be higher than the frequency of the report signals of the second sensor detection circuit 97.

As described above, the display device 1 includes the array substrate 10, the counter substrate 20, the liquid crystal layer 50, and the light source 3. The array substrate 10 includes the pixel electrodes PE serving as first light-transmitting electrodes each disposed in a corresponding one of the pixels Pix. The array substrate 10 is provided with the signal lines SL arranged with spaces in the first direction PX and the scanning lines GL arranged with spaces in the second direction PY. The counter substrate 20 includes the common electrodes CE serving as second light-transmitting electrodes in positions overlapping the pixel electrodes PE in the plan view. The liquid crystal layer 50 includes the polymer-dispersed liquid crystals filled between the array substrate 10 and the counter substrate 20. The light source 3 emits the light in the second direction PY to a side surface of the counter substrate 20. The direction of incidence of the light that propagates in the array substrate 10 and the counter substrate 20 is the second direction. The light source 3 may emit the light that propagates in the array substrate 10 and the counter substrate 20 toward a side surface of the array substrate 10.

The second electrodes Tx2 serving as the detection electrodes of the second sensor TP2 extend in the first direction PX and are arranged in the second direction PY. The holding capacitance electrodes IC extend in the second direction PY as the first electrodes Rx2 of the second sensor TP2, and are arranged in the first direction PX. With this configuration, the thickness of the second sensor TP2 is less than that in the first embodiment, and the sensor-equipped display device 200 of the second embodiment has a higher light transmitting capability than that of the first embodiment. The sensor-equipped display device 200 of the second embodiment has the same operational advantages as those of the sensor-equipped display device 200 of the first embodiment.

Third Embodiment

Figure 31:
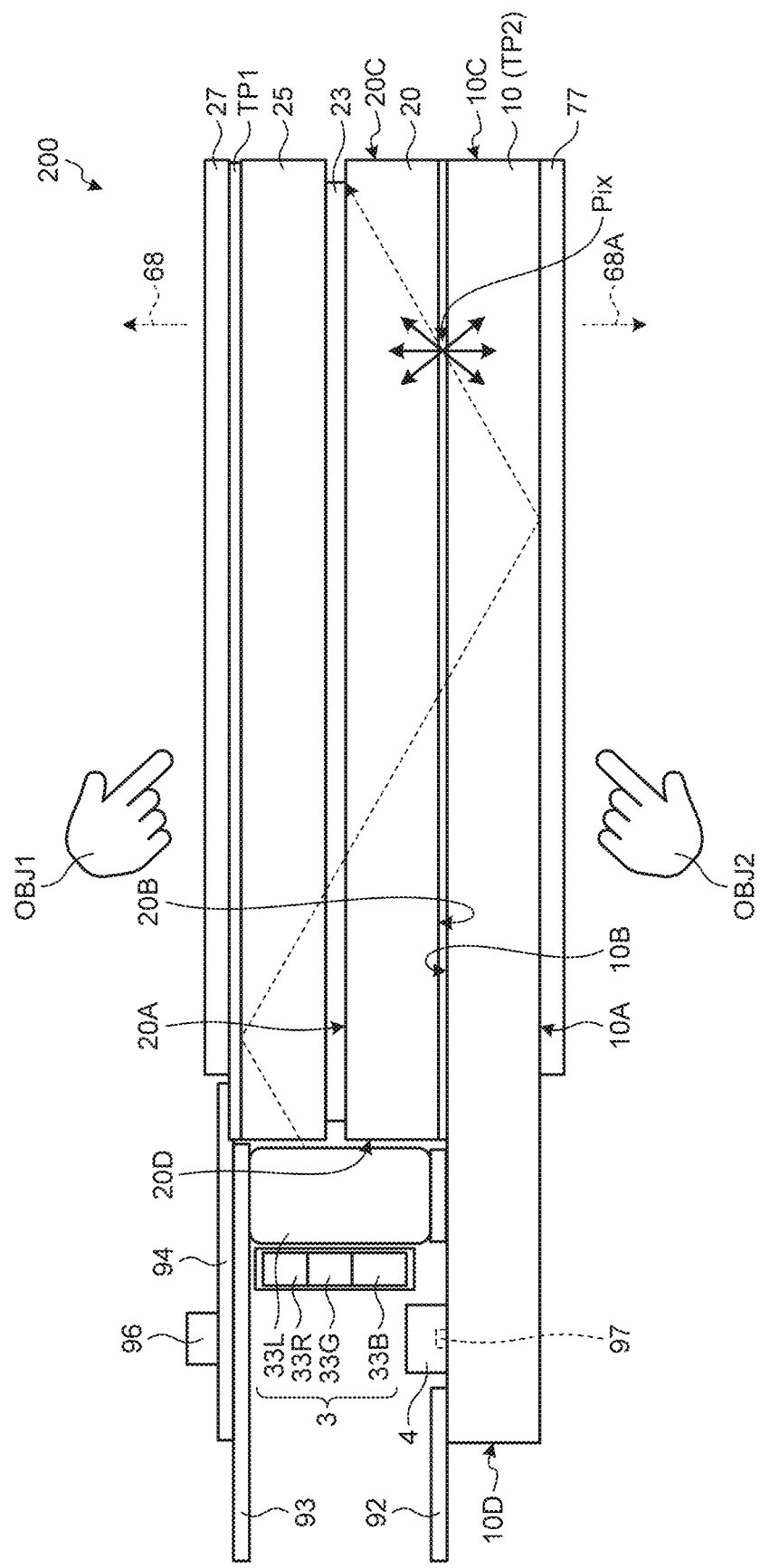
FIG. 31 is a sectional view illustrating an example of a display device according to a third embodiment.
Figure 32:
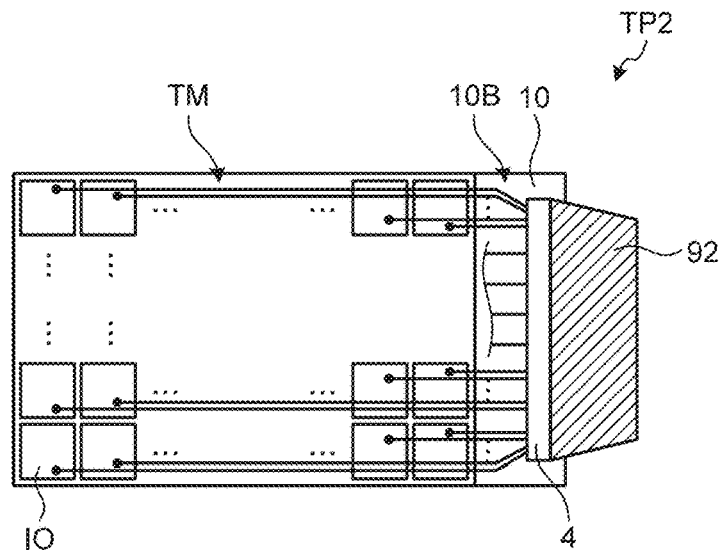
FIG. 32 is a plan view of the drive electrodes formed in the holding capacitance layer of the third embodiment.
Figure 33:
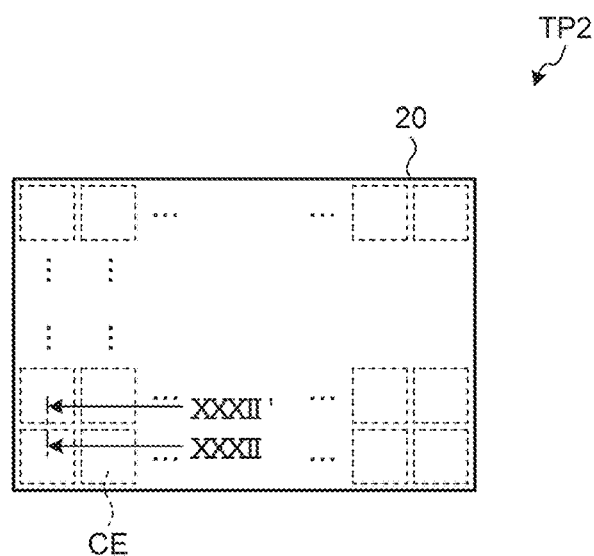
FIG. 33 is a plan view of the drive electrodes formed of the counter electrodes of the third embodiment.

FIG. 31 is a sectional view illustrating an example of the display device according to a third embodiment. FIG. 32 is a plan view of the drive electrodes formed in the holding capacitance layer of the third embodiment. FIG. 33 is a plan view of the drive electrodes formed of the counter electrodes of the third embodiment. The same components as those described in either of the above-described embodiments are denoted by the same reference numerals, and the description thereof will not be repeated.

As illustrated in FIG. 31, the second sensor TP2 is built into the array substrate 10. As illustrated in FIG. 32, when the second principal surface 10B of the array substrate 10 is viewed from above, the holding capacitance electrodes IO are arranged in a matrix having a row-column configuration in the first direction PX and the second direction PY.

As illustrated in FIG. 33, when the counter substrate 20 is viewed from above, the common electrodes CE are arranged in a matrix having a row-column configuration in the first direction PX and the second direction PY. One common electrode CE of FIG. 33 occupies an area having substantially the same outer shape as that of one holding capacitance electrode IO of FIG. 32 overlapping the one common electrode CE in the plan view. One common electrode CE of FIG. 33 is electrically coupled to one holding capacitance electrode IO of FIG. 32 overlapping the one common electrode CE in the plan view in the position of the spacer PS of FIG. 22. With this configuration, when the alternating-current rectangular wave Sg2 having the predetermined frequency is applied to one holding capacitance electrode IO to drive the one holding capacitance electrode IO, the same alternating-current wave is applied to one common electrode CE of FIG. 33 overlapping the one holding capacitance electrode IO in the plan view.

When the second detection-target object OBJ2 is present, the capacitance between the second detection-target object OBJ2 and the holding capacitance electrode IO is added to the capacitance of the holding capacitance electrode IO.

Therefore, when the alternating-current wave for detection is applied to the holding capacitance electrodes IO, a change in the capacitance occurs only in the holding capacitance electrode IO close to the second detection-target object OBJ2. In this manner, the position of the holding capacitance electrode IO that has changed in capacitance is identified by detecting the change in what is called self-capacitance of the holding capacitance electrodes IO. The presence and position of the second detection-target object OBJ2 are measured. The holding capacitance electrodes IO serve as the detection electrodes of the second sensor.

As illustrated in FIG. 31, the drive circuit 4 includes the sensor detection circuit 97. The detection signal of the second sensor TP2 is supplied to the sensor detection circuit 97, and the report signal processed by the sensor detection circuit 97 is externally output through the flexible substrate 92.

As illustrated in FIG. 29, the first detection period TP1Scan in which the first sensor TP1 performs the detection operation is processed at the same time as the display period. In contrast, the second detection period TP2Scan in which the second sensor TP2 performs the detection operation is processed separately from the display period in a time-division manner. As a result, the frequency of the report signals of the first sensor detection circuit 96 illustrated in FIG. 31 can be higher than the frequency of the report signals of the second sensor detection circuit 97.

Alternatively, as illustrated in FIG. 30, the first detection period TP1Scan in which the first sensor TP1 performs the detection operation is processed at the same time as the display period. In contrast, the second detection period TP2Scan in which the second sensor TP2 performs the detection operation is processed separately from the vertical scanning period GateScan in a time-division manner. As a result, the frequency of the report signals of the first sensor detection circuit 96 illustrated in FIG. 31 can be higher than the frequency of the report signals of the second sensor detection circuit 97.

Figure 34:
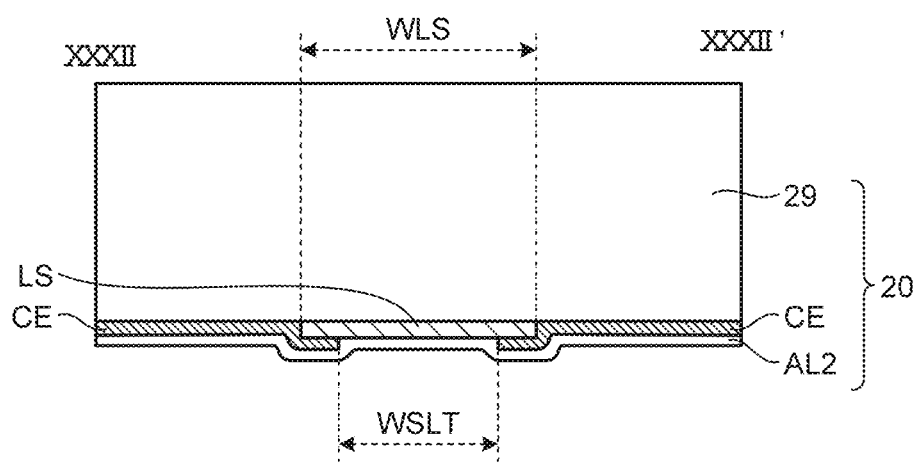
FIG. 34 is a sectional view along XXXII-XXXII' of FIG. 33.

FIG. 34 is a sectional view along XXXII-XXXII' of FIG. 33. As illustrated in FIG. 33, the light-blocking layer LS is disposed between the adjacent common electrodes CE. A width WLS of the light-blocking layer LS is greater than a distance WSLT between the adjacent common electrodes CE. With this configuration, a slit between the common electrodes CE is difficult to be viewed.

The holding capacitance electrodes IC serving as the electrodes of the second sensor TP2 are divided by the slits and are arranged in a matrix having a row-column configuration in the first direction and the second direction. With this configuration, the second sensor TP2 is built into the array substrate 10, the thickness of the second sensor TP2 is less than in the first embodiment and the second embodiment, and the light transmitting capability of the sensor-equipped display device 200 of the third embodiment is improved as compared with that of the first embodiment and the second embodiment. The sensor-equipped display device 200 of the third embodiment has the same operational advantages as those of the sensor-equipped display device 200 of the first embodiment.

Fourth Embodiment

Figure 35:
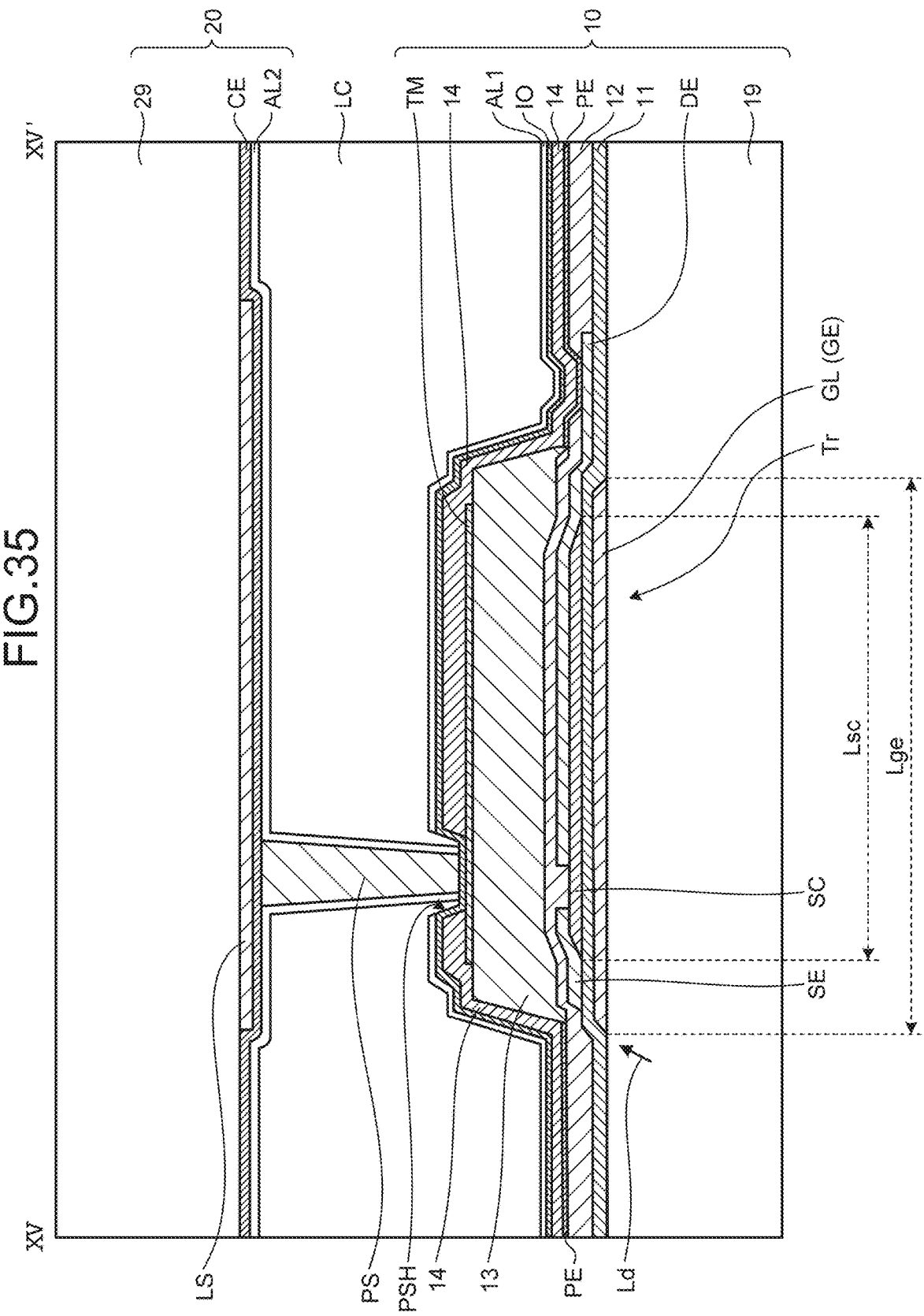
FIG. 35 is a sectional view along XXII-XXII' of FIG. 21 in a fourth embodiment.

FIG. 35 is a sectional view along XXII-XXII' of FIG. 21 in a fourth embodiment. The same components as those described in any of the above-described embodiments are denoted by the same reference numerals, and the description thereof will not be repeated. In the fourth embodiment, the holding capacitance electrode IO is stacked above the pixel electrode PE with the fourth insulating layer 14 interposed therebetween.

As illustrated in FIG. 18, since the light-transmitting conductive material is formed in a grid shape, the holding capacitance electrode IO has the region IOX including no light-transmitting conductive material in each of the regions surrounded by the scanning lines GL and the signal lines SL. Even if the stacking order of the pixel electrode PE and the holding capacitance electrode IO illustrated in FIG. 22 is reversed, the region including the pixel electrode PE overlaps the region IOX including no light-transmitting conductive material as illustrated in FIG. 18. Therefore, the display device of the fourth embodiment can change the scattering state of the polymer-dispersed liquid crystals filled between the array substrate 10 and the counter substrate 20 depending on the potential of the pixel electrode PE.

Since the holding capacitance electrode IC is stacked above the pixel electrode PE with the fourth insulating layer 14 interposed therebetween, the holding capacitance electrode IC can be easily electrically coupled to the spacer PS. In FIG. 35, the common electrode CE is coupled to the holding capacitance electrode IC through the conductive spacer PS. In addition, the holding capacitance electrode IC is coupled to the metal layer TM through a contact hole PSH formed in the fourth insulating layer 14. As illustrated in FIG. 32, the holding capacitance electrodes IC and the common electrodes CE arranged in a matrix having a row-column configuration as the second sensor are drawn to the drive circuit 4 through the metal layers TM. In this case, the shape of the metal layers TM is not limited to a grid shape and may have a linear shape extending only along the signal lines SL. When the metal layers TM are formed in a grid shape, the metal layers TM are formed so as not to be coupled to the other of the metal layers TM coupled to the second sensor.

Fifth Embodiment

Figure 36:
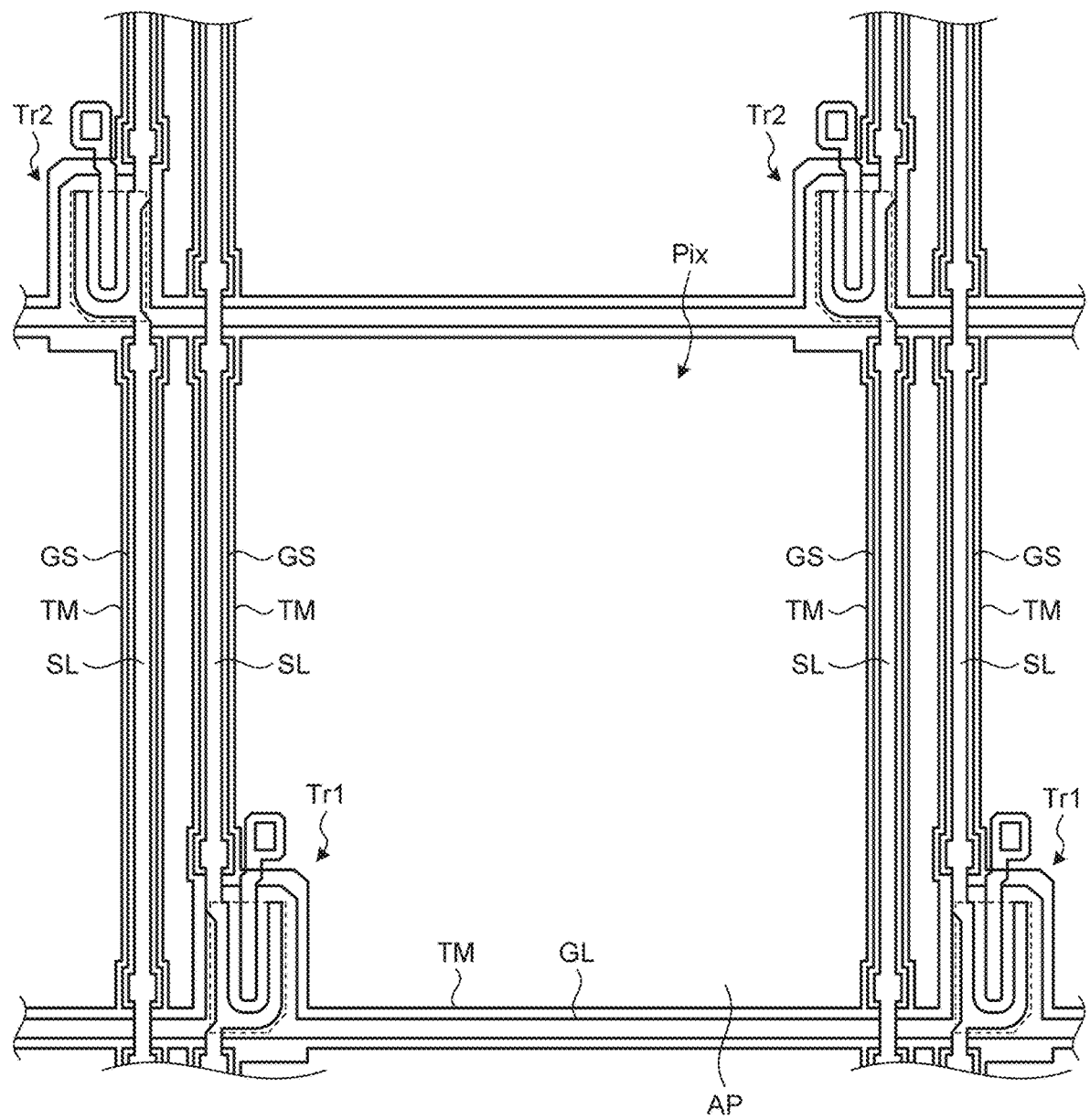
FIG. 36 is a plan view illustrating the scanning lines, the signal lines, and switching elements in the pixels of a fifth embodiment.
Figure 37:
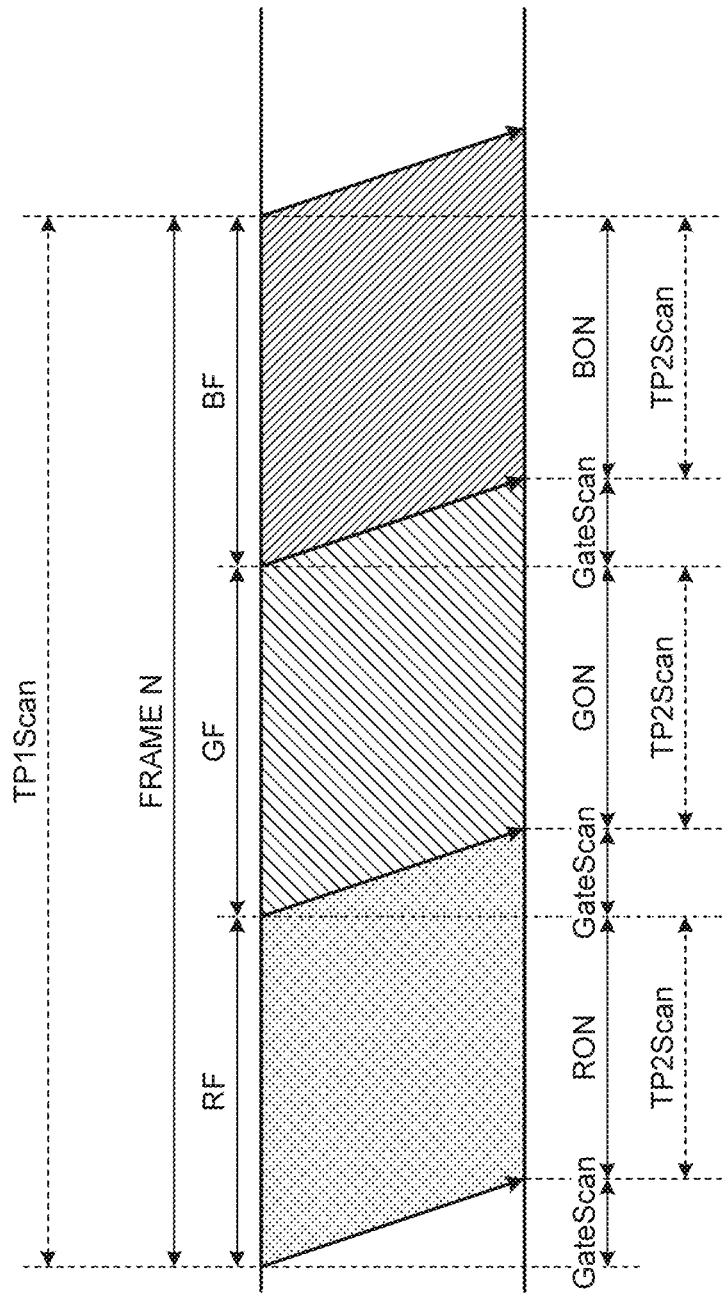
FIG. 37 is a timing diagram explaining a timing of a light emission by a light source in a field-sequential system of the fifth embodiment.

FIG. 36 is a plan view illustrating the scanning lines, the signal lines, and switching elements in the pixels of a fifth embodiment. FIG. 37 is a timing diagram explaining the timing of the light emission by the light source in the field-sequential system of the fifth embodiment. The same components as those described in any of the above-described embodiments are denoted by the same reference numerals, and the description thereof will not be repeated.

As illustrated in FIG. 36, the pixels Pix of the fifth embodiment have a configuration in which, unlike in the configuration of the pixels Pix of the second embodiment, two of the signal lines SL are provided between the adjacent pixels Pix. One of the signal lines SL is electrically coupled to a switching element Tr1 provided at an intersection with the scanning line GL for every other pixel Pix. The other of the signal lines SL is electrically coupled to a switching element Tr2 provided at an intersection with the scanning line GL for every other pixel Pix except the pixel Pix including the switching element Tr1.

This configuration allows the gate drive circuit to simultaneously select adjacent two of the scanning lines GL. As a result, the one vertical scanning period GateScan illustrated in FIG. 37 is reduced to be shorter than the one vertical scanning period GateScan illustrated in FIG. 29. As illustrated in FIG. 37, reducing each one vertical scanning period GateScan can relatively increase the first color light emission period RON, the second color light emission period GON, and the third color light emission period BON coming after each one vertical scanning period GateScan. As a result, the second detection period TP2Scan at the same time as each of the first color light emission period RON, the second color light emission period GON, and the third color light emission period BON can be increased.

While the preferred embodiments have been described above, the present disclosure is not limited to such embodiments. The content disclosed in the embodiments is merely an example, and can be variously modified within the scope not departing from the gist of the present disclosure. For example, the present disclosure has been described by exemplifying the sensor-equipped liquid crystal display device. However, the display device is not limited to the liquid crystal display device and may be a self-luminous display device, such as an organic electroluminescent (EL) display device or a micro light-emitting diode (LED) display device, which functions as a transparent display. Any modifications appropriately made within the scope not departing from the gist of the present disclosure also naturally belong to the technical scope of the present disclosure.

What is claimed is:

1. A sensor-equipped display device comprising:
   an array substrate;
   a counter substrate;
   a first sensor configured to detect a first detection-target object close to the counter substrate;
   a second sensor configured to detect a second detection-target object close to the array substrate,
   a cover glass bonded to the counter substrate;
   a liquid crystal layer between the array substrate and the counter substrate; and
   a light source disposed so as to emit light into a side surface of the cover glass and a side surface of the counter substrate, wherein
   a first background of the array substrate is viewed from outside the counter substrate, and a second background of the counter substrate is viewed from outside the array substrate,
   the cover glass is located between the counter substrate and the first sensor,
   the second sensor is provided to the array substrate,
   the array substrate comprises a plurality of pixel electrodes each disposed in a corresponding one of pixels and holding capacitance electrodes at least partially overlapping the pixel electrodes in a plan view with an inorganic insulating layer interposed between the holding capacitance electrodes and the pixel electrodes, and
   the holding capacitance electrodes are divided by slits and serve as drive electrodes of the second sensor.

2. The sensor-equipped display device according to claim 1, wherein
   the counter substrate comprises common electrodes in positions overlapping the pixel electrodes,
   the common electrodes are divided to have a size of substantially the same outer shape in the plan view as that of each of the drive electrodes of the second sensor, and
   the common electrodes are electrically coupled to the drive electrodes of the second sensor overlapping the common electrodes in the plan view.

3. The sensor-equipped display device according to claim 2, wherein the common electrodes are electrically coupled to the holding capacitance electrodes in positions of spacers located between the counter substrate and the array substrate.

4. The sensor-equipped display device according to claim 2, wherein
   the counter substrate comprises a light-blocking layer, and
   a width of the light-blocking layer is greater than a distance between the adjacent common electrodes.

5. The sensor-equipped display device according to claim 1, wherein a plurality of detection electrodes of the second sensor are provided to a principal surface of the array substrate opposite to the counter substrate.

6. The sensor-equipped display device according to claim 5, wherein
   the detection electrodes of the second sensor extend in a first direction and are arranged in a second direction, and
   the holding capacitance electrodes extend in the second direction and are arranged in the first direction.

7. The sensor-equipped display device according to claim 6, wherein
   a first detection period in which the first sensor performs detection operation is processed at the same time as a display period, and
   a second detection period in which the second sensor performs the detection operation is processed separately from the display period in a time-division manner.

8. The sensor-equipped display device according to claim 7, comprising:
   a first sensor detection circuit configured to process a detection signal of the first sensor; and
   a second sensor detection circuit configured to process a detection signal of the second sensor, wherein
   a frequency of report signals of one of the first sensor detection circuit and the second sensor detection circuit is higher than a frequency of report signals of the other of the first sensor detection circuit and the second sensor detection circuit.

9. The sensor-equipped display device according to claim 6, wherein
   a first detection period in which the first sensor performs detection operation is processed at the same time as a display period, and
   a second detection period in which the second sensor performs the detection operation is processed at the same time as a light emission period among a vertical scanning period in which writing is performed to the common electrodes that is included in the display period and the light emission period in which the light source emits the light.

10. The sensor-equipped display device according to claim 6, further comprising a first sensor detection circuit configured to process a detection signal of the first sensor, wherein
    the array substrate comprises:
    a plurality of signal lines arranged with spaces in a first direction;
    a plurality of scanning lines arranged with spaces in a second direction; and
    a drive circuit comprising a gate drive circuit coupled to the scanning lines, a source drive circuit coupled to the signal lines, and a second sensor detection circuit configured to process a detection signal of the second sensor, and
    a frequency of report signals of the first sensor detection circuit among the first sensor detection circuit and the second sensor detection circuit is higher than a frequency of report signals of the second sensor detection circuit.

11. The sensor-equipped display device according to claim 6, wherein the holding capacitance electrode is located closer to the counter substrate than the pixel electrodes are, and in the holding capacitance electrode, a light-transmitting conductive material is formed in a grid shape, and regions including no light-transmitting conductive material overlap regions of the pixel electrodes, in the plan view.

12. The sensor-equipped display device according to claim 5, further comprising a protective layer that covers the detection electrodes of the second sensor, wherein an effective sheet resistance value of the protective layer is in a range from $10^9$ ohm/square to $10^{12}$ ohm/square.

13. The sensor-equipped display device according to claim 1, further comprising a metal layer stacked on the holding capacitance electrodes.

14. The sensor-equipped display device according to claim 13, wherein the array substrate comprises:
a plurality of signal lines arranged with spaces in a first direction; and
a plurality of scanning lines arranged with spaces in a second direction, and in the plan view, a width of the metal layer overlapping the signal lines is greater than a width of each of the signal lines, and a width of the metal layer overlapping the scanning lines is greater than a width of each of the scanning lines.

15. The sensor-equipped display device according to claim 2, further comprising a signal processing circuit, wherein the signal processing circuit is configured to
process an image that is displayed together with the first background in accordance with a detection signal of the first sensor, assuming a display surface viewed from outside the counter substrate as a front face, and process an image that is displayed together with the second background in accordance with a detection signal of the second sensor, assuming a display surface viewed from outside the array substrate as a front face.

16. The sensor-equipped display device according to claim 15, wherein the liquid crystal layer is made of polymer-dispersed liquid crystals.

* * * * *